(12) United States Patent
Shibata et al.

(10) Patent No.: US 10,203,430 B2
(45) Date of Patent: Feb. 12, 2019

(54) METHOD OF PRODUCING OPTICAL LAMINATE COMPRISING HARD COAT LAYER COMPRISED OF CURED PRODUCT OF COMPOSITION COMPRISING (METH)ACRYLIC PREPOLYMER HAVING HYDROXYL GROUP

(71) Applicant: NITTO DENKO CORPORATION, Ibaraki-shi, Osaka (JP)

(72) Inventors: Shusaku Shibata, Ibaraki (JP); Katsunori Takada, Ibaraki (JP); Hiroyuki Takemoto, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 11 days.

(21) Appl. No.: 15/664,747

(22) Filed: Jul. 31, 2017

(65) Prior Publication Data
US 2017/0329050 A1    Nov. 16, 2017

Related U.S. Application Data

(62) Division of application No. 14/111,866, filed as application No. PCT/JP2012/060420 on Apr. 18, 2012, now Pat. No. 9,720,134.

(30) Foreign Application Priority Data

Apr. 22, 2011 (JP) ................................ 2011-095721
Apr. 16, 2012 (JP) ................................ 2012-093002

(51) Int. Cl.
G02B 1/04 (2006.01)
G02B 1/14 (2015.01)
(Continued)

(52) U.S. Cl.
CPC ............... *G02B 1/04* (2013.01); *G02B 1/105* (2013.01); *G02B 1/14* (2015.01); *G02B 5/3033* (2013.01);
(Continued)

(58) Field of Classification Search
CPC ........... C08L 33/08; C08L 33/10; G02B 1/04; G02B 1/10; G02B 1/105; G02B 1/11;
(Continued)

(56) References Cited

U.S. PATENT DOCUMENTS 7,332,213 B2    2/2008  Mimura et al.
7,585,560 B2    9/2009  Miyazaki et al.
(Continued)

FOREIGN PATENT DOCUMENTS

| CN | 1575970 A | 2/2005 |
|---|---|---|
| CN | 1962748 A | 5/2007 |

(Continued)

OTHER PUBLICATIONS

International Search Report dated Jun. 19, 2012, issued in corresponding apllication No. PCT/JP2012/060420.
(Continued)

*Primary Examiner* — Jennifer D Carruth
*Assistant Examiner* — Ryan S Dunning
(74) *Attorney, Agent, or Firm* — Westerman, Hattori, Daniels & Adrian, LLP

(57) ABSTRACT

There is provided an optical laminate excellent in adhesiveness between a (meth)acrylic resin film (base material film) having low moisture permeability and a UV absorbing ability and a hard coat layer, and has suppressed interference unevenness. An optical laminate according to an embodiment of the present invention includes: a base material layer formed of a (meth)acrylic resin film; a hard coat layer formed by applying a composition for forming a hard coat
(Continued)

layer to the (meth)acrylic resin film; and a penetration layer formed through penetration of the composition for forming a hard coat layer into the (meth)acrylic resin film, the penetration layer being placed between the base material layer and the hard coat layer, wherein the penetration layer has a thickness of 1.2 μm or more.

16 Claims, 4 Drawing Sheets

(51) Int. Cl.
    *G02B 5/30*     (2006.01)
    *G02B 1/10*     (2015.01)

(52) U.S. Cl.
    CPC ...... *G02F 2201/50* (2013.01); *G02F 2202/28* (2013.01); *Y10T 428/24355* (2015.01); *Y10T 428/265* (2015.01)

(58) Field of Classification Search
    CPC ......... G02B 1/111; G02B 1/113; G02B 1/118; G02B 1/14; G02B 5/003; G02B 5/02; G02B 5/0205; G02B 5/0236; G02B 5/206; G02B 5/0242; G02B 5/0278; G02F 1/133504
    USPC ............ 252/582; 359/361, 488.01, 599, 601, 359/609, 614, 615; 427/162, 163.1, 164; 428/1.5, 1.6
    See application file for complete search history.

(56) References Cited

U.S. PATENT DOCUMENTS

| | | | |
|---|---|---|---|
| 8,092,872 | B2 | 1/2012 | Kondo et al. |
| 2005/0008863 | A1 | 1/2005 | Mimura et al. |
| 2005/0147809 | A1 | 7/2005 | Hongo et al. |
| 2005/0196632 | A1 | 9/2005 | Maschwitz et al. |
| 2005/0261392 | A1 | 11/2005 | Futami et al. |
| 2006/0099385 | A1 | 5/2006 | Onozawa et al. |
| 2006/0134428 | A1 | 6/2006 | Miyazaki et al. |
| 2006/0141243 | A1 | 6/2006 | Ibuki |
| 2007/0243364 | A1 | 10/2007 | Maekawa et al. |
| 2007/0253752 | A1 | 11/2007 | Kurachi et al. |
| 2007/0285776 | A1* | 12/2007 | Nakamura ............. G02B 1/105 359/487.02 |
| 2008/0125550 | A1 | 5/2008 | Hara et al. |
| 2008/0131674 | A1 | 6/2008 | Kondo et al. |
| 2008/0284950 | A1* | 11/2008 | Itoh .......................... C09D 5/24 349/96 |
| 2009/0002831 | A1 | 1/2009 | Mikami et al. |
| 2009/0130472 | A1 | 5/2009 | Kondo et al. |
| 2009/0280317 | A1* | 11/2009 | Nakashima ............. G02B 1/105 428/332 |
| 2010/0047484 | A1 | 2/2010 | Kitagishi et al. |
| 2010/0124631 | A1 | 5/2010 | Horio et al. |
| 2010/0143674 | A1 | 6/2010 | Yoshihara et al. |
| 2010/0168363 | A1 | 7/2010 | Ueda et al. |
| 2010/0227085 | A1 | 9/2010 | Yoshihara |
| 2010/0272971 | A1 | 10/2010 | Miyai et al. |
| 2011/0217541 | A1 | 9/2011 | Shimano et al. |
| 2011/0304817 | A1 | 12/2011 | Nakatsukasa et al. |
| 2012/0189828 | A1 | 7/2012 | Inomata et al. |
| 2012/0208038 | A1 | 8/2012 | Kondo et al. |
| 2012/0251778 | A1 | 10/2012 | Shimano et al. |
| 2014/0044891 | A1 | 2/2014 | Shibata et al. |
| 2014/0227482 | A1 | 8/2014 | Shibata et al. |
| 2014/0247486 | A1 | 9/2014 | Shibata et al. |

FOREIGN PATENT DOCUMENTS

| | | |
|---|---|---|
| CN | 101156089 A | 4/2008 |
| CN | 101421432 A | 4/2009 |
| JP | H06-184267 A | 7/1994 |
| JP | 2002-036436 A | 2/2002 |
| JP | 2003-236970 A | 8/2003 |
| JP | 2005-097371 A | 4/2005 |
| JP | 2006-110875 A | 4/2006 |
| JP | 2006-126802 A | 5/2006 |
| JP | 2006-137835 A | 6/2006 |
| JP | 2006-205545 A | 8/2006 |
| JP | 2006-274119 A | 10/2006 |
| JP | 2007-090656 A | 4/2007 |
| JP | 2007-187746 A | 7/2007 |
| JP | 2007-254706 A | 10/2007 |
| JP | 2008-012675 A | 1/2008 |
| JP | 2008-165041 A | 7/2008 |
| JP | 2008-165205 A | 7/2008 |
| JP | 2008-184515 A | 8/2008 |
| JP | 2008-216330 A | 9/2008 |
| JP | 2008-257041 A | 10/2008 |
| JP | 2009-42648 A | 2/2009 |
| JP | 2009-075248 A | 4/2009 |
| JP | 2009-084328 A | 4/2009 |
| JP | 2009-126879 A | 6/2009 |
| JP | 2009-161609 A | 7/2009 |
| JP | 2009-185282 A | 8/2009 |
| JP | 2010-039418 A | 2/2010 |
| JP | 2010-044163 A | 2/2010 |
| JP | 2010-065109 A | 3/2010 |
| JP | 2010-082564 A | 4/2010 |
| JP | 2010-122323 A | 6/2010 |
| JP | 2010-237648 A | 10/2010 |
| JP | 2011-033948 A | 2/2011 |
| JP | 2005-041205 A | 2/2017 |
| JP | 2005-219272 A | 8/2017 |
| TW | 200821618 A | 5/2008 |
| WO | 2006/106757 A1 | 10/2006 |
| WO | 2007/015512 A1 | 2/2007 |
| WO | 2008/032813 A1 | 3/2008 |
| WO | 2010/122912 A1 | 10/2010 |
| WO | 2005/105918 A1 | 11/2015 |

OTHER PUBLICATIONS

Office Action dated Dec. 22, 2014, issued in Chinese Application No. 201280019681.5.
Office Action dated Oct. 13, 2015, issued in Chinese Application No. 201280019681.5.
Office Action dated Jan. 20, 2016, issued in Japanese Application No. 2012-093002.
Final Office Action dated Feb. 25, 2016, issued in U.S. Appl. No. 14/112,481.
Office Action dated Nov. 2, 2015, issued in Taiwanese Patent Application No. 101114324.
Office Action dated Jan. 20, 2016, issued in Japanese Application No. 2012-093003.
International Search Report dated Jun. 19, 2012, issued in Application No. PCT/JP2012/060421.
Office Action dated Jan. 20, 2015, issued in Chinese Application No. 201280019680.0.
Non-Final Office Action dated Jan. 11, 2016, issued in U.S. Appl. No. 14/111,866.
Office Action dated Jan. 20, 2016, issued in Japanese Application No. 2012-093004.
International Search Report dated Jul. 24, 2012, issued in Apllication No. PCT/JP2012/060422.
Office Action dated Nov. 19, 2014, issued in Chinese Application No. 201280019682.X.
Office Action dated Oct. 12, 2015, issued in Taiwanese Patent Application No. 101114325.
Office Action dated Jan. 20, 2016, issued in Japanese Application No. 2012-093004, counterpart of U.S. Appl. No. 14/112,496.
International Search Report dated Jul. 24, 2012, issued in application No. PCT/JP2012/060422, counterpart of U.S. Appl. No. 14/112,496.
Office Action dated Nov. 19, 2014, issued in Chinese Application No. 201280019682.X, counterpart of U.S. Appl. No. 14/112,496.

(56) References Cited

OTHER PUBLICATIONS

Office Action dated Oct. 12, 2015, issued in Taiwanese Patent Application No. 101114325, counterpart of U.S. Appl. No. 14/112,496.
Non-final Office Action dated Feb. 2, 2015, issued in U.S. Appl. No. 14/112,496.
Final Office Action dated Aug. 28, 2015, issued in U.S. Appl. No. 14/112,496.
Non-final Office Action dated Feb. 26, 2016, issued in U.S. Appl. No. 14/112,496.
International Search Report dated Jun. 19, 2012, issued in Application No. PCT/JP2012/060420.
International Search report dated Jun. 19, 2012, issued in PCT/JP2012/060420, counterpart of U.S. Appl. No. 14/111,866.
Office Action dated Dec. 22, 2014, issued in Chinese Application No. 201280019681.5, counterpart of U.S. Appl. No. 14/111,866.
Office Action dated Oct. 13, 2015, issued in Chinese Application No. 201280019681.5, counterpart of U.S. Appl. No. 14/111,866.
Office Action dated Jan. 20, 2016, issued in Japanese Application No. 2012-093002, counterpart of U.S. Appl. No. 14/111,866.
Office Action dated Jan. 20, 2016, issued in Japanese Patent Application No. 2012-093004.
Office Action dated Nov. 19, 2014, issued in Chinese Patent Application No. 201280019682.X.
International Search Report dated Jul. 24, 2014, issued in Application No. PCT/JP2012/060422.
Office Action dated Aug. 31, 2016, issued in Japanesse application No. 2012-093002.
Non-Final Office Action dated Sep. 7, 2016, issued in U.S. Appl. No. 14/112,481.
Final Office Action dated Sep. 6, 2016, issued in U.S. Appl. No. 14/112,496.
Office Action dated Aug. 31, 2016, issued in Japanesse application No. 2012-093004.
Non-Final Office Action dated May 30, 2017 issued in U.S. Appl. No. 14/112,481.
Office Action dated Aug. 30, 2017, issued in Japanese Patent Application No. 2012-093003 with English translation.
Office Action dated Oct. 4, 2017, issued in Japanese Application No. 2016-232698, with English translation.

\* cited by examiner

METHOD OF PRODUCING OPTICAL LAMINATE COMPRISING HARD COAT LAYER COMPRISED OF CURED PRODUCT OF COMPOSITION COMPRISING (METH)ACRYLIC PREPOLYMER HAVING HYDROXYL GROUP

CROSS-REFERENCE TO RELATED APPLICATION

This application is a divisional of U.S. application Ser. No. 14/111,866, filed on Oct. 15, 2013, which is a 371 of International Application No. PCT/JP2012/060420, filed on Apr. 18, 2012, which claims the benefit of priority from the prior Japanese Patent Application No. 2011-095721, filed on Apr. 22, 2011 and Japanese Patent Application No. 2012-093002, filed on Apr. 16, 2012, the entire contents of which are incorporated herein by reference.

TECHNICAL FIELD

The present invention relates to an optical laminate.

BACKGROUND ART

When the surface of an image display apparatus such as a liquid crystal display (LCD), a cathode-ray tube display apparatus (CRT), a plasma display (PDP), or an electroluminescence display (ELD) is flawed by external contact, the visibility of a display image may reduce. Accordingly, an optical laminate including a base material film and a hard coat layer has been used for the purpose of protecting the surface of the image display apparatus. Triacetylcellulose (TAC) has been representatively used in the base material film of the optical laminate. However, the base material film formed of TAC has a high moisture permeability. Accordingly, when the optical laminate including such base material film is used in the LCD, the following problem arises. Under high temperature and high humidity, moisture permeates the optical laminate to deteriorate the optical characteristics of a polarizer. In recent years, the LCD has been frequently used in devices to be used outdoors such as a car navigation system and a personal digital assistant in addition to indoor use, and hence a high-reliability LCD that does not cause the problem even under severe conditions such as high temperature and high humidity has been required.

An optical laminate obtained by applying a composition for forming a hard coat layer to a low-moisture permeability cycloolefin base material film has been proposed for solving the problem (Patent Literature 1). However, such cycloolefin base material film involves the following problem. The base material film has poor adhesiveness with a hard coat layer. In addition, the following problem arises. Interference unevenness occurs owing to a difference in refractive index between the base material film and the hard coat layer. Further, the cycloolefin base material film involves the following problem. The base material film does not have a sufficient UV absorbing ability and hence the optical characteristics of an optical laminate using the base material film deteriorate owing to, for example, ambient light. Accordingly, an optical laminate that uses a base material film having low moisture permeability and a high UV absorbing ability, but suppresses interference unevenness by satisfying sufficient adhesiveness between the base material film and a hard coat layer has not yet been put into practical use.

PRIOR ART DOCUMENTS

Patent Document

[PTL 1] JP 2006-110875 A

SUMMARY OF INVENTION

Problem to be Solved by the Invention

The present invention has been made to solve the conventional problems, and an object of the present invention is to provide an optical laminate that is excellent in adhesiveness between a (meth)acrylic resin film (base material film) having low moisture permeability and a UV absorbing ability and a hard coat layer, and has suppressed interference unevenness.

Means for Solving the Problems

An optical laminate according to an embodiment of the present invention includes: a base material layer formed of a (meth)acrylic resin film; a hard coat layer formed by applying a composition for forming a hard coat layer to the (meth)acrylic resin film; and a penetration layer formed through penetration of the composition for forming a hard coat layer into the (meth)acrylic resin film, the penetration layer being placed between the base material layer and the hard coat layer, wherein the penetration layer has a thickness of 1.2 μm or more.

In an embodiment of the present invention, in the penetration layer, a concentration of a (meth)acrylic resin forming the (meth)acrylic resin film continuously increases from a side close to the hard coat layer to a side close to the base material layer.

In an embodiment of the present invention, an amplitude of a reflection spectrum of the hard coat layer in a wavelength region of 500 nm to 600 nm is 0.5% or less.

In an embodiment of the present invention, an absolute value of a difference between a refractive index of the base material layer and a refractive index of the hard coat layer is 0.01 to 0.15.

In an embodiment of the present invention, the (meth) acrylic resin film has a transmittance for light having a wavelength of 380 nm of 15% or less.

In an embodiment of the present invention, a (meth) acrylic resin forming the (meth)acrylic resin film has a structural unit expressing positive birefringence and a structural unit expressing negative birefringence.

In an embodiment of the present invention, the composition for forming a hard coat layer contains a curable compound having two or more (meth)acryloyl groups.

In an embodiment of the present invention, the composition for forming a hard coat layer further contains a monofunctional monomer.

In an embodiment of the present invention, the monofunctional monomer has a weight-average molecular weight of 500 or less.

In an embodiment of the present invention, the monofunctional monomer has a hydroxyl group.

In an embodiment of the present invention, monofunctional monomer includes a hydroxyalkyl (meth)acrylate and/or an N-(2-hydroxyalkyl) (meth)acrylamide.

In an embodiment of the present invention, the composition for forming a hard coat layer contains a urethane (meth)acrylate and/or an oligomer of the urethane (meth) acrylate.

In an embodiment of the present invention, the composition for forming a hard coat layer contains a (meth)acrylic prepolymer having a hydroxyl group.

In an embodiment of the present invention, the composition for forming a hard coat layer is free of a solvent.

In an embodiment of the present invention, a surface of the hard coat layer opposite to the penetration layer has an uneven structure.

In an embodiment of the present invention, the optical laminate further includes an antireflection layer on a side of the hard coat layer opposite to the penetration layer.

According to another aspect of the present invention, a polarizing film is provided. The polarizing film includes the optical laminate.

According to another aspect of the present invention, an image display apparatus is provided. The imaged is play apparatus includes the optical laminate.

According to another aspect of the present invention, a method of producing the optical laminate is provided. The method of producing the optical laminate includes applying a composition for forming a hard coat layer onto a (meth)acrylic resin film to form an application layer; and heating the application layer at 80° C. to 140° C.

Advantageous Effects of Invention

According to the present invention, the following optical laminate is provided. The optical laminate includes a base material layer and a hard coat layer formed by applying a composition for forming a hard coat layer onto a (meth) acrylic resin film (base material film), and a penetration layer formed by the penetration of the composition for forming a hard coat layer into the (meth)acrylic resin film. Accordingly, despite the fact that the optical laminate uses, as its base material film, the (meth)acrylic resin film having low moisture permeability, the optical laminate is excellent in adhesiveness between the base material film and the hard coat layer, and has suppressed interference unevenness. The optical laminate of the present invention can provide excellent adhesiveness between the (meth)acrylic resin film (base material film) and the hard coat layer without providing any anchor layer and without subjecting the (meth)acrylic resin film (base material film) to any physical treatment. In addition, according to the present invention, a hard coat layer can be formed also on a (meth)acrylic resin film (base material film) having a UV absorbing ability as well as low moisture permeability so as to have excellent adhesiveness with the film.

DESCRIPTION OF EMBODIMENTS

Hereinafter, preferred embodiments of the present invention are described but the present invention is not limited to these embodiments.

A. Entire Construction of Optical Laminate

Figure 1A:
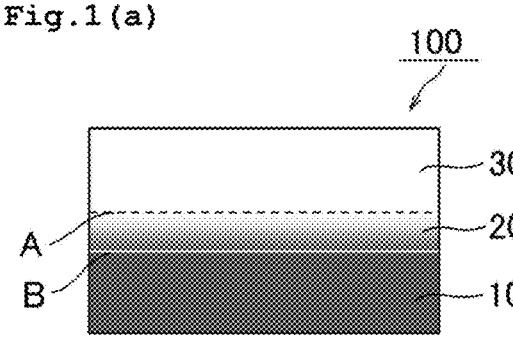
FIG. 1(a) is a schematic sectional view of an optical laminate according to a preferred embodiment of the present invention and FIG. 1(b) is an example of a schematic sectional view of a conventional optical laminate having a general hard coat layer.
Figure 1B:
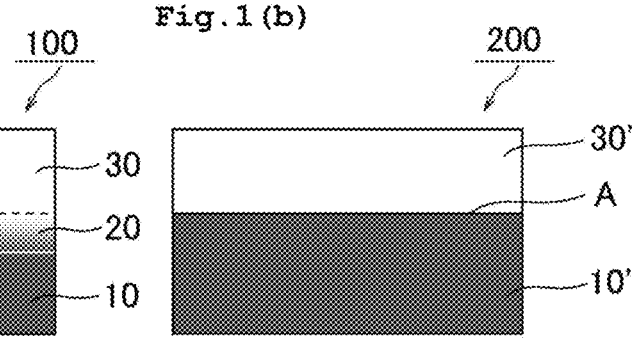

FIG. 1(a) is a schematic sectional view of an optical laminate according to a preferred embodiment of the present invention and FIG. 1(b) is a schematic sectional view of a conventional optical laminate having a general hard coat layer. An optical laminate 100 illustrated in FIG. 1(a) includes a base material layer 10 formed of a (meth)acrylic resin film, a penetration layer 20, and a hard coat layer 30 in the stated order. The hard coat layer 30 is formed by applying a composition for forming a hard coat layer to the (meth)acrylic resin film. The penetration layer 20 is formed by the penetration of the composition for forming a hard coat layer into the (meth)acrylic resin film. The base material layer 10 is a portion in the (meth)acrylic resin film where the composition for forming a hard coat layer has not reached (penetrated) at the time of such penetration of the composition for forming a hard coat layer into the (meth)acrylic resin film. On the other hand, no penetration layer is formed in an optical laminate 200 illustrated in FIG. 1(b). A boundary A illustrated in each of FIGS. 1(a) and 1(b) is a boundary specified by the surface of the (meth)acrylic resin film to which the composition for forming a hard coat layer is applied. Therefore, the boundary A is a boundary between the penetration layer 20 and the hard coat layer 30 in the optical laminate 100, and is a boundary between a base material layer 10' (i.e., the (meth)acrylic resin film) and a hard coat layer 30' in the optical laminate 200 in which no penetration layer is formed. It should be noted that the term "(meth)acryl" as used herein means acryl and/or methacryl.

As described above, the penetration layer 20 is formed by the penetration of the composition for forming a hard coat layer into the (meth)acrylic resin film in the optical laminate 100. That is, the penetration layer 20 is a portion in the (meth)acrylic resin film where a hard coat layer component is present. The thickness of the penetration layer 20 is 1.2 μm or more. It should be noted that the thickness of the penetration layer 20 is the thickness of the portion in the (meth)acrylic resin film where the hard coat layer component is present, and the thickness is specifically a distance between a boundary B between the portion in the meth (acrylic) resin film where the hard coat layer component is present (penetration layer) and the portion in the film where the component is not present (base material layer), and the boundary A.

In the optical laminate of the present invention, any appropriate other layer (not shown) may be placed outside the hard coat layer 30 as required. The other layer is representatively placed through a pressure-sensitive adhesive layer (not shown).

A (meth)acrylic resin forming the (meth)acrylic resin film may be present in the hard coat layer as a result of the elution of the (meth)acrylic resin into the composition for forming a hard coat layer.

Figure 2:
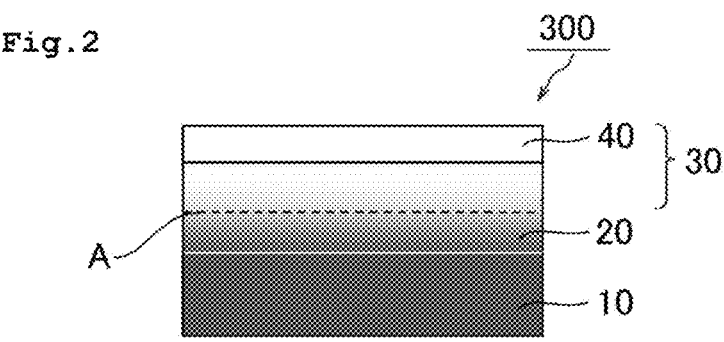
FIG. 2 is a schematic sectional view of an optical laminate according to another embodiment of the present invention.

FIG. 2 is a schematic sectional view of an optical laminate according to another embodiment of the present invention.

An optical laminate 300 further includes a block layer 40 on the side of the hard coat layer 30 opposite to the penetration layer 20. The block layer 40 is produced by the occurrence of a phase separation between the composition for forming a hard coat layer and the (meth)acrylic resin forming the (meth)acrylic resin film as a result of the elution of the (meth)acrylic resin into the composition for forming a hard coat layer. The optical laminate including the block layer 40 is excellent in scratch resistance.

The amplitude of the reflection spectrum of the hard coat layer of the optical laminate of the present invention in the wavelength region of 500 nm to 600 nm is preferably 0.5% or less, more preferably 0.3% or less, still more preferably 0.1% or less. According to the present invention, an optical laminate having a small amplitude of a reflection spectrum, i.e., small interference unevenness can be obtained.

The optical laminate of the present invention has the penetration layer having a predetermined thickness. Accordingly, even when materials largely different from each other in refractive index are selected as formation materials for the (meth)acrylic resin film and the hard coat layer, the occurrence of interference unevenness can be prevented. In the optical laminate of the present invention, the absolute value of a difference between the refractive index of the base material layer and the refractive index of the hard coat layer can be set to, for example, 0.01 to 0.15. Of course, the absolute value of the difference in refractive index can be set to less than 0.01.

The optical laminate of the present invention is applied to, for example, a polarizing film (sometimes referred to as "polarizing plate"). Specifically, in the polarizing film, the optical laminate of the present invention is provided on one surface, or each of both surfaces, of a polarizer, and can be suitably used as a protective material for the polarizer.

B. Base Material Layer

The base material layer is formed of the (meth)acrylic resin film. More specifically, as described above, the base material layer is the portion in the (meth)acrylic resin film where the composition for forming a hard coat layer has not reached (penetrated) upon application of the composition for forming a hard coat layer to the (meth)acrylic resin film.

The (meth)acrylic resin film contains the (meth)acrylic resin. The (meth)acrylic resin film is obtained by, for example, subjecting a forming material containing a resin component containing the (meth)acrylic resin as a main component to extrusion molding.

The moisture permeability of the (meth)acrylic resin film is preferably 200 g/m²·24 hr or less, more preferably 80 g/m²·24 hr or less. According to the present invention, even when the (meth)acrylic resin film having such high moisture permeability is used, an optical laminate that is excellent in adhesiveness between the (meth)acrylic resin film and the hard coat layer, and that has suppressed interference unevenness can be obtained. It should be noted that the moisture permeability can be measured by, for example, a method in conformity with JIS 20208 under the test conditions of 40° C. and a relative humidity of 92%.

The (meth)acrylic resin film has a transmittance for light having a wavelength of 380 nm of preferably 15% or less, more preferably 12% or less, still more preferably 9% or less. As long as the transmittance for light having a wavelength of 380 nm falls within such range, an excellent UV absorbing ability is expressed and hence the UV deterioration of the optical laminate due to ambient light or the like can be prevented.

The (meth)acrylic resin film has an in-plane retardation Re of preferably 10 nm or less, more preferably 7 nm or less, still more preferably 5 nm or less, particularly preferably 3 nm or less, most preferably 1 nm or less. The (meth)acrylic resin film has a thickness direction retardation Rth of preferably 15 nm or less, more preferably 10 nm or less, still more preferably 5 nm or less, particularly preferably 3 nm or less, most preferably 1 nm or less. As long as the in-plane retardation and the thickness direction retardation fall within such ranges, adverse effects on the display characteristics of an image display apparatus resulting from the retardations can be significantly suppressed. More specifically, interference unevenness and the distortion of a 3D image when the film is used in a liquid crystal display apparatus for 3D display can be significantly suppressed. The (meth)acrylic resin film whose in-plane retardation and thickness direction retardation fall within such ranges can be obtained by using, for example, a (meth)acrylic resin having a glutarimide structure to be described later. It should be noted that the in-plane retardation Re and the thickness direction retardation Rth are determined from the following respective equations.

$$Re=(nx-ny) \times d$$

$$Rth=(nx-nz) \times d$$

Here, nx represents the refractive index of the (meth)acrylic resin film in its slow axis direction, ny represents the refractive index of the (meth)acrylic resin film in its fast axis direction, nz represents the refractive index of the (meth)acrylic resin film in its thickness direction, and d (nm) represents the thickness of the (meth)acrylic resin film. The term "slow axis" refers to the direction in which a refractive index in a film surface becomes maximum and the term "fast axis" refers to a direction vertical to the slow axis in the surface. The Re and the Rth are representatively measured with light having a wavelength of 590 nm.

Any appropriate (meth)acrylic resin may be adopted as the (meth)acrylic resin. Examples thereof include poly(meth)acrylates such as polymethyl methacrylate, a methyl methacrylate-(meth)acrylic acid copolymer, a methyl methacrylate-(meth)acrylate copolymer, a methyl methacrylate-acrylate-(meth)acrylic acid copolymer, a methyl (meth)acrylate-styrene copolymer (such as an MS resin), and polymers each having an alicyclic hydrocarbon group (such as a methyl methacrylate-cyclohexyl methacrylate copolymer and a methyl methacrylate-norbornyl(meth)acrylate copolymer). Of those, a poly $C_{1-6}$ alkyl (meth)acrylate such as polymethyl (meth)acrylate is preferably given. A methyl methacrylate-based resin including methyl methacrylate as a main component (50 to 100% by weight, preferably 70 to 100% by weight) is more preferably given.

The weight-average molecular weight of the (meth)acrylic resin is preferably 10,000 to 500,000. When the weight-average molecular weight is excessively small, a film made of the resin tends to have an insufficient mechanical strength. When the weight-average molecular weight is excessively large, the following tendency is observed: the viscosity of the resin at the time of melt extrusion is high, its formability reduces, and the productivity of a formed article reduces.

The glass transition temperature of the (meth)acrylic resin is preferably 110° C. or more, more preferably 120° C. or more. As long as the glass transition temperature falls within such range, a (meth)acrylic resin film excellent in durability and heat resistance can be obtained. An upper limit for the glass transition temperature, which is not particularly limited, is preferably 170° C. or less from the viewpoint of, for example, formability.

The (meth)acrylic resin preferably has a structural unit expressing positive birefringence and a structural unit expressing negative birefringence. As long as the resin has those structural units, the retardations of the (meth)acrylic resin film can be controlled by adjusting an abundance ratio between the units, and hence a (meth)acrylic resin film having low retardations can be obtained. Examples of the structural unit expressing positive birefringence include a structural unit constituting a lactone ring, polycarbonate, polyvinyl alcohol, cellulose acetate, polyester, polyallylate, polyimide, polyolefin, or the like, and a structural unit represented by the general formula (1) to be described later. Examples of the structural unit expressing negative birefringence include a structural unit derived from a styrene-based monomer, maleimide-based monomer, or the like, a structural unit of a polymethyl methacrylate, and a structural unit represented by the general formula (3) to be described later. The term "structural unit expressing positive birefringence" as used herein means a structural unit in the case where a resin having only the structural unit shows a positive birefringent characteristic (i.e., the case where a slow axis is expressed in a stretching direction of the resin). In addition, the term "structural unit expressing negative birefringence" means a structural unit in the case where a resin having only the structural unit shows a negative birefringent characteristic (i.e., the case where a slow axis is expressed in a direction vertical to a stretching direction of the resin).

A (meth)acrylic resin having a lactone ring structure or a glutarimide structure is preferably used as the (meth)acrylic resin. The (meth)acrylic resin having a lactone ring structure or a glutarimide structure is excellent in heat resistance. The (meth)acrylic resin having a glutarimide structure is more preferred. The use of the (meth)acrylic resin having a glutarimide structure can provide a (meth)acrylic resin film having low moisture permeability, small retardations, and a small UV transmittance as described above. The (meth) acrylic resin having a glutarimide structure (hereinafter sometimes referred to as "glutarimide resin") is described in, for example, Japanese Patent Application Laid-open No. 2006-309033, Japanese Patent Application Laid-open No. 2006-317560, Japanese Patent Application Laid-open No. 2006-328329, Japanese Patent Application Laid-open No. 2006-328334, Japanese Patent Application Laid-open No. 2006-337491, Japanese Patent Application Laid-open No. 2006-337492, Japanese Patent Application Laid-open No. 2006-337493, Japanese Patent Application Laid-open No. 2006-337569, Japanese Patent Application Laid-open No. 2007-009182, or Japanese Patent Application Laid-open No. 2009-161744. Those descriptions are incorporated herein by reference.

The glutarimide resin preferably contains a structural unit represented by the following general formula (1) (hereinafter sometimes referred to as "glutarimide unit") and a structural unit represented by the following general formula (2) (hereinafter sometimes referred to as "(meth)acrylate unit").

[Chem. 1]

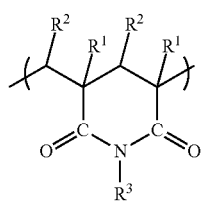

(1)

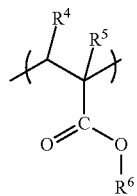

(2)

In the formula (1), $R^1$ and $R^2$ each independently represent hydrogen or an alkyl group having 1 to 8 carbon atoms, and $R^3$ represents hydrogen, an alkyl group having 1 to 18 carbon atoms, a cycloalkyl group having 3 to 12 carbon atoms, or a substituent containing an aromatic ring having 5 to 15 carbon atoms. In the formula (2), $R^4$ and $R^5$ each independently represent hydrogen or an alkyl group having 1 to 8 carbon atoms, and $R^6$ represents hydrogen, an alkyl group having 1 to 18 carbon atoms, a cycloalkyl group having 3 to 12 carbon atoms, or a substituent containing an aromatic ring having 5 to 15 carbon atoms.

The glutarimide resin may further contain a structural unit represented by the following general formula (3) (hereinafter sometimes referred to as "aromatic vinyl unit") as required.

[Chem. 2]

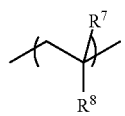

(3)

In the formula (3), $R^7$ represents hydrogen or an alkyl group having 1 to 8 carbon atoms and $R^8$ represents an aryl group having 6 to 10 carbon atoms.

It is preferred that in the general formula (1), $R^1$ and $R^2$ each independently represent hydrogen or a methyl group, and $R^3$ represent hydrogen, a methyl group, a butyl group, or a cyclohexyl group. It is more preferred that $R^1$ represent a methyl group, $R^2$ represent hydrogen, and $R^3$ represent a methyl group.

The glutarimide resin may contain only one kind of glutarimide unit, or may contain a plurality of kinds of glutarimide units different from each other in $R^1$, $R^2$, or $R^3$ in the general formula (1).

The glutarimide unit can be formed by imidizing the (meth)acrylate unit represented by the general formula (2). In addition, the glutarimide unit can be formed by imidizing: an acid anhydride such as maleic anhydride, or a half ester of such acid anhydride and a linear or branched alcohol having 1 to 20 carbon atoms; an α,β-ethylenically unsaturated carboxylic acid such as acrylic acid, methacrylic acid, maleic acid, maleic anhydride, itaconic acid, itaconic anhydride, crotonic acid, fumaric acid, or citraconic acid; or the like.

It is preferred that in the general formula (2), $R^4$ and $R^5$ each independently represent hydrogen or a methyl group, and $R^6$ represent hydrogen or a methyl group. It is more preferred that $R^4$ represent hydrogen, $R^5$ represent a methyl group, and $R^6$ represent a methyl group.

The glutarimide resin may contain only one kind of (meth)acrylate unit, or may contain a plurality of kinds of (meth)acrylate units different from each other in $R^4$, $R^5$, or $R^6$ in the general formula (2).

The glutarimide resin contains, as the aromatic vinyl unit represented by the general formula (3), preferably styrene, α-methylstyrene, or the like, more preferably styrene. The presence of such aromatic vinyl unit reduces the positive birefringence of the glutarimide structure and hence can provide a (meth)acrylic resin film having additionally low retardations.

The glutarimide resin may contain only one kind of aromatic vinyl unit, or may contain a plurality of kinds of aromatic vinyl units different from each other in $R^7$ or $R^8$.

The content of the glutarimide unit in the glutarimide resin is preferably changed depending on, for example, the structure of $R^3$. The content of the glutarimide unit is preferably 1 wt % to 80 wt %, more preferably 1 wt % to 70 wt %, still more preferably 1 wt % to 60 wt %, particularly preferably 1 wt % to 50 wt % with reference to all structural units of the glutarimide resin. As long as the content of the glutarimide unit falls within such range, a (meth)acrylic resin film excellent in heat resistance and having low retardations can be obtained.

The content of the aromatic vinyl unit in the glutarimide resin can be appropriately set in accordance with purposes and desired characteristics. The content of the aromatic vinyl unit may be 0 depending on applications. When the aromatic vinyl unit is incorporated, its content is preferably 10 wt % to 80 wt %, more preferably 20 wt % to 80 wt %, still more preferably 20 wt % to 60 wt %, particularly preferably 20 wt % to 50 wt % with reference to the glutarimide unit of the glutarimide resin. As long as the content of the aromatic vinyl unit falls within such range, a (meth)acrylic resin film having low retardations, and excellent in heat resistance and mechanical strength can be obtained.

The glutarimide resin may be further copolymerized with any structural unit other than the glutarimide unit, the (meth)acrylate unit, and the aromatic vinyl unit as required. Examples of the other structural unit include structural units constituted of: nitrile-based monomers such as acrylonitrile and methacrylonitrile; and maleimide-based monomers such as maleimide, N-methylmaleimide, N-phenylmaleimide, and N-cyclohexylmaleimide. Each of the other structural units may be directly copolymerized with the glutarimide resin, or may be subjected to graft copolymerization.

The (meth)acrylic resin film contains a UV absorbing agent. Any appropriate UV absorbing agent can be adopted as the UV absorbing agent as long as the desired characteristics are obtained. Representative examples of the UV absorbing agent include a triazine-based UV absorbing agent, a benzotriazole-based UV absorbing agent, a benzophenone-based UV absorbing agent, a cyanoacrylate-based UV absorbing agent, a benzoxazine-based UV absorbing agent, and an oxadiazole-based UV absorbing agent. Those UV absorbing agents may be used alone or in combination.

The content of the UV absorbing agent is preferably 0.1 part by weight to 5 parts by weight, more preferably 0.2 part by weight to 3 parts by weight with respect to 100 parts by weight of the (meth)acrylic resin. As long as the content of the UV absorbing agent falls within such range, UV light can be effectively absorbed and the transparency of the film at the time of the forming of the film does not reduce. When the content of the UV absorbing agent is less than 0.1 part by weight, a blocking effect on UV light tends to be insufficient. When the content of the UV absorbing agent is more than 5 parts by weight, the following tendency is observed: coloring becomes vigorous, the haze of the film after the forming increases, or the transparency deteriorates.

The (meth)acrylic resin film may contain any appropriate additive in accordance with purposes. Examples of the additive include hindered phenol-based, phosphorus-based, and sulfur-based antioxidants; stabilizers such as a light stabilizer, a weathering stabilizer, and a heat stabilizer; reinforcing materials such as glass fibers and carbon fibers; a near infrared ray absorbing agent; flame retardants such as tris(dibromopropyl) phosphate, triallyl phosphate, and antimony oxide; antistatic agents such as anionic, cationic, and nonionic surfactants; colorants such as an inorganic pigment, an organic pigment, and a dye; an organic filler and an inorganic filler; a resin modifier; an organic filling agent and an inorganic filling agent; a plasticizer; a lubricant; an antistatic agent; a flame retardant; and a retardation reducing agent. The kind, combination, content, and the like of the additive to be incorporated can be appropriately set in accordance with purposes and desired characteristics.

Although a method of producing the (meth)acrylic resin film is not particularly limited, for example, a (meth)acrylic resin, a UV absorbing agent, and another polymer, additive, or the like as required are thoroughly mixed by any appropriate mixing method to obtain a thermoplastic resin composition previously, and then the composition may be formed into a film. Alternatively, the (meth)acrylic resin, the UV absorbing agent, and the another polymer, additive, or the like as required are formed into separate solutions. After that, the solutions are mixed to obtain a homogenous mixed solution, and then, the solution may be formed into a film.

For producing the thermoplastic resin composition, for example, the above-mentioned film materials are preblended with any appropriate mixer such as an omni mixer, and then, the obtained mixture is extruded and kneaded. In this case, the mixer to be used for extrusion and kneading is not particularly limited, and for example, any appropriate mixer including an extruder such as a uniaxial extruder or a biaxial extruder and a pressure kneader may be used.

Available as a method for the film forming is any appropriate film forming method such as a solution casting method, a melt extrusion method, a calendering method, or a compression molding method. Of those, the melt extrusion method is preferred. The melt extrusion method can reduce a production cost and the load of a solvent on a global environment or working environment because the method does not involve using any solvent.

Examples of the melt extrusion method include a T-die method and an inflation method. The forming temperature is preferably 150 to 350° C., more preferably 200 to 300° C.

In the case of forming a film by the T-die method, a T-die is attached to a tip end of a known uniaxial extruder or a biaxial extruder, and a film extruded in a film shape is taken up to obtain a roll-shaped film. At this time, when a stretching force is applied in an extrusion direction while appropriately adjusting the temperature of a take-up roll, the film may be also stretched uniaxially. Further, when a film is stretched in a direction vertical to the extrusion direction, simultaneous biaxial stretching, sequential biaxial stretching, or the like may also be performed.

The (meth)acrylic resin film may be any of an unstretched film and a stretched film as long as the desired retardation is obtained. In the case where the film is a stretched film, the film may be any of a uniaxially stretched film and a biaxially stretched film. In the case where the film is a biaxially stretched film, the film may be any of a simultaneously biaxially stretched film and a sequentially biaxially stretched film.

The stretching temperature is preferably close to the glass transition temperature of a thermoplastic resin composition as a film raw material. Specifically, the stretching temperature falls within the range of preferably (glass transition temperature−30° C.) to (glass transition temperature+30° C.), more preferably (glass transition temperature−20° C.) to (glass transition temperature+20° C.). When the stretching temperature is less than (glass transition temperature−30° C.), the haze of the film to be obtained may increase, or the film may tear or crack to preclude the acquisition of a predetermined stretching ratio. In contrast, when the stretching temperature exceeds (glass transition temperature+30° C.), the following tendency is observed: the thickness unevenness of the film to be obtained enlarges, or its mechanical properties such as an elongation ratio, a tear propagation strength, and flex fatigue resistance cannot be sufficiently improved. Further, a trouble such as the sticking of the film to a roll tends to be liable to occur.

The stretching ratio is preferably 1.1 to 3 times, more preferably 1.3 to 2.5 times. As long as the stretching ratio falls within such range, the mechanical properties of the film such as an elongation ratio, a tear propagation strength, and flex fatigue resistance can be significantly improved. As a result, a film whose thickness unevenness is small, whose birefringence is substantially zero (therefore, retardations are small), and whose haze is small can be produced.

The (meth)acrylic resin film may be subjected to heat treatment (annealing) or the like after stretching treatment in order to stabilize its optical isotropy and mechanical characteristics. As the conditions of the heat treatment, any appropriate conditions may be adopted.

The thickness of the (meth)acrylic resin film is preferably 10 µm to 200 µm, more preferably 20 µm to 100 µm. When the thickness is less than 10 µm, strength may be decreased. When the thickness exceeds 200 µm, transparency may be decreased.

The wetting tension of the surface of the (meth)acrylic resin film is preferably 40 mN/m or more, more preferably 50 mN/m or more, still more preferably 55 mN/m or more. When the wetting tension of the surface is at least 40 mN/m or more, the adhesiveness between the (meth)acrylic resin film and the hard coat layer is further enhanced. In order to adjust the wetting tension of the surface, any appropriate surface treatment may be performed. Examples of the surface treatment include corona discharge treatment, plasma treatment, ozone spraying, UV-ray irradiation, flame treatment, and chemical treatment. Of those, corona discharge treatment and plasma treatment are preferably used.

C. Penetration Layer

As described above, the penetration layer is formed by the penetration of the composition for forming a hard coat layer into the (meth)acrylic resin film. In other words, the penetration layer can correspond to part of a region where the (meth)acrylic resin forming the (meth)acrylic resin film and the component forming the hard coat layer are made compatible with each other.

It is preferred that in the penetration layer, the concentration of the (meth)acrylic resin forming the (meth)acrylic resin film continuously increase from a hard coat layer side to a base material layer side. This is because of the following reason. When the concentration of the (meth)acrylic resin continuously changes, i.e., no interface resulting from a change in concentration of the (meth)acrylic resin is formed, interface reflection can be suppressed and an optical laminate showing small interference unevenness can be obtained.

A lower limit for the thickness of the penetration layer is 1.2 µm, preferably 1.5 µm, more preferably 2.5 µm, still more preferably 3 µm. An upper limit for the thickness of the penetration layer is preferably (thickness of the (meth)acrylic resin film×70%) µm, more preferably (thickness of the (meth)acrylic resin film×40%) µm, still more preferably (thickness of the (meth)acrylic resin film×30%) µm, particularly preferably (thickness of the (meth)acrylic resin film×20%) µm. As long as the thickness of the penetration layer falls within such range, an optical laminate that is excellent in adhesiveness between the (meth)acrylic resin film and the hard coat layer, and that has suppressed interference unevenness can be obtained. It should be noted that the thickness of the penetration layer can be measured on the basis of: the reflection spectrum of the hard coat layer; or observation with an electron microscope such as an SEM or a TEM. Details about a method of measuring the thickness of the penetration layer on the basis of the reflection spectrum are described later as an evaluation method in Examples.

D. Hard Coat Layer

As described above, the hard coat layer is formed by applying the composition for forming a hard coat layer onto the (meth)acrylic resin film. The composition for forming a hard coat layer contains a curable compound that can cure with, for example, heat, light (e.g., UV light), or an electron beam. The composition for forming a hard coat layer preferably contains a curable compound that is photocurable. The curable compound may be any one of a monomer, an oligomer, and a prepolymer.

The composition for forming a hard coat layer preferably contains a curable compound having two or more (meth)acryloyl groups. An upper limit for the number of (meth)acryloyl groups in the curable compound having two or more (meth)acryloyl groups is preferably 100. The curable compound having two or more (meth)acryloyl groups easily penetrates and diffuses into the (meth)acrylic resin film at the time of the application because the compound is excellent in compatibility with the (meth)acrylic resin. It should be noted that the term "(meth)acryloyl" as used herein means methacryloyl and/or acryloyl.

Examples of the curable compound having two or more (meth)acryloyl groups include tricyclodecanedimethanol diacrylate, pentaerythritol di(meth)acrylate, pentaerythritol tri(meth)acrylate, trimethylolpropane triacrylate, pentaerythritol tetra(meth)acrylate, dimethylolpropane tetraacrylate, dipentaerythritol hexa(meth)acrylate, 1,6-hexanediol (meth)acrylate, 1,9-nonanediol diacrylate, 1,10-decanediol (meth)acrylate, polyethylene glycol di(meth)acrylate, polypropylene glycol di(meth)acrylate, dipropylene glycol diacrylate, isocyanuric acid tri(meth)acrylate, ethoxylated glycerine triacrylate, ethoxylated pentaerythritol tetraacrylate, and an oligomer and prepolymer thereof. These curable compounds each having two or more (meth)acryloyl groups may be used alone or in combination. It should be noted that the term "(meth)acrylate" as used herein means an acrylate and/or a methacrylate.

The curable compound having two or more (meth)acryloyl groups preferably has a hydroxyl group. When the composition for forming a hard coat layer contains such curable compound, a heating temperature at the time of the formation of the hard coat layer can be set to an additionally low temperature and a heating time at the time can be set to an additionally short time, and hence an optical laminate whose deformation due to heating has been suppressed can be efficiently produced. In addition, an optical laminate excellent in adhesiveness between the (meth)acrylic resin film and the hard coat layer can be obtained. Examples of the curable compound having a hydroxyl group and two or more (meth)acryloyl groups include pentaerythritol tri(meth)acrylate and dipentaerythritol pentaacrylate.

The content of the curable compound having two or more (meth)acryloyl groups is preferably 30 wt % to 100 wt %, more preferably 40 wt % to 95 wt %, particularly preferably 50 wt % to 95 wt % with respect to the total amount of a monomer, oligomer, and prepolymer in the composition for forming a hard coat layer. As long as the content falls within such range, an optical laminate that is excellent in adhesiveness between the (meth)acrylic resin film and the hard coat layer, and that has suppressed interference unevenness can be obtained. In addition, the shrinkage on curing of the hard coat layer can be effectively prevented.

The composition for forming a hard coat layer may contain a monofunctional monomer as a curable compound. The monofunctional monomer easily penetrates into the (meth)acrylic resin film. Accordingly, when the composition contains the monofunctional monomer, an optical laminate that is excellent in adhesiveness between the (meth)acrylic resin film and the hard coat layer, and that has suppressed interference unevenness can be obtained. In addition, when the composition for forming a hard coat layer contains the monofunctional monomer, the heating temperature at the time of the formation of the hard coat layer can be set to a low temperature and the heating time at the time can be set to a short time, and hence an optical laminate whose deformation due to heating has been suppressed can be efficiently produced. When the composition for forming a hard coat layer contains the monofunctional monomer, the content of the monofunctional monomer is preferably 40 wt % or less, more preferably 30 wt % or less, particularly preferably 20 wt % or less with respect to all curable compounds in the composition for forming a hard coat layer. When the content of the monofunctional monomer is more than 40 wt %, desired hardness and desired scratch resistance may not be obtained.

The weight-average molecular weight of the monofunctional monomer is preferably 500 or less. Such monofunctional monomer easily penetrates and diffuses into the (meth)acrylic resin film. Examples of such monofunctional monomer include ethoxylated o-phenylphenol (meth)acrylate, methoxy polyethylene glycol (meth)acrylate, phenoxy polyethylene glycol (meth)acrylate, 2-ethylhexyl acrylate, lauryl acrylate, isooctyl acrylate, isostearyl acrylate, cyclohexyl acrylate, isobornyl acrylate, benzyl acrylate, 2-hydroxy-3-phenoxy acrylate, acryloylmorpholine, 2-hydroxyethyl(meth)acrylate, 4-hydroxybutyl (meth)acrylate, dimethylaminopropylacrylamide, and N-(2-hydroxyethyl)(meth)acrylamide.

The monofunctional monomer preferably has a hydroxyl group. With such monofunctional monomer, the heating temperature at the time of the formation of the hard coat layer can be set to an additionally low temperature and the heating time at the time can be set to an additionally short time, and hence an optical laminate whose deformation due to heating has been suppressed can be efficiently produced. In addition, when the composition for forming a hard coat layer contains the monofunctional monomer having a hydroxyl group, an optical laminate excellent in adhesiveness between the (meth)acrylic resin film and the hard coat layer can be obtained. Examples of such monofunctional monomer include: hydroxyalkyl (meth)acrylates such as 2-hydroxyethyl (meth)acrylate, 2-hydroxypropyl (meth) acrylate, 4-hydroxybutyl (meth)acrylate, 2-hydroxy-3-phenoxy acrylate, and 1,4-cyclohexanemethanol monoacrylate; and N-(2-hydroxyalkyl) (meth)acrylamides such as N-(2-hydroxyethyl) (meth)acrylamide and N-methylol(meth)acrylamide. Of those, 4-hydroxybutyl acrylate and N-(2-hydroxyethyl)acrylamide are preferred.

The boiling point of the monofunctional monomer is preferably higher than the heating temperature (described later) of an application layer at the time of the formation of the hard coat layer. The boiling point of the monofunctional monomer is, for example, preferably 150° C. or more, more preferably 180° C. or more, particularly preferably 200° C. or more. As long as the boiling point falls within such range, the monofunctional monomer can be prevented from volatilizing owing to heating at the time of the formation of the hard coat layer and hence the monofunctional monomer can be caused to penetrate into the (meth)acrylic resin film sufficiently.

The composition for forming a hard coat layer preferably contains a urethane (meth)acrylate and/or an oligomer of the urethane (meth)acrylate as a curable compound. When the composition for forming a hard coat layer contains the urethane (meth)acrylate and/or the oligomer of the urethane (meth)acrylate, a hard coat layer excellent in flexibility and adhesiveness with the (meth)acrylic resin film can be formed. The urethane (meth)acrylate can be obtained by, for example, subjecting a hydroxy(meth)acrylate obtained from a (meth)acrylic acid or a (meth)acrylate and a polyol to a reaction with a diisocyanate. The urethane (meth)acrylate and oligomer of the urethane (meth)acrylate may be used alone or in combination.

Examples of the (meth)acrylate include methyl (meth)acrylate, ethyl (meth)acrylate, isopropyl (meth)acrylate, butyl (meth)acrylate, and cyclohexyl (meth)acrylate.

Examples of the polyol include ethylene glycol, 1,3-propylene glycol, 1,2-propylene glycol, diethylene glycol, dipropylene glycol, neopentyl glycol, 1,3-butanediol, 1,4-butanediol, 1,6-hexanediol, 1,9-nonanediol, 1,10-decanediol, 2,2,4-trimethyl-1,3-pentanediol, 3-methyl-1,5-pentanediol, neopentyl glycol hydroxypivalate, tricyclodecanedimethylol, 1,4-cyclohexanediol, spiroglycol, hydrogenated bisphenol A, a bisphenol A-ethylene oxide adduct, a bisphenol A-propylene oxide adduct, trimethylolethane, trimethylolpropane, glycerine, 3-methylpentane-1,3,5-triol, pentaerythritol, dipentaerythritol, tripentaerythritol, and glucoses.

For example, various kinds of aromatic, aliphatic, and alicyclic diisocyanates can be used as the diisocyanate. Specific examples of the diisocyanate include tetramethylene diisocyanate, hexamethylene diisocyanate, isophorone diisocyanate, 2,4-trilene diisocyanate, 4,4-diphenyl diisocyanate, 1,5-naphthalene diisocyanate, 3,3-dimethyl-4,4-diphenyl diisocyanate, xylene diisocyanate, trimethylhexamethylene diisocyanate, 4,4-diphenylmethane diisocyanate, and a hydrogenated product thereof.

The total content of the urethane (meth)acrylate and the oligomer of the urethane (meth)acrylate is preferably 5 wt % to 70 wt %, more preferably 5 wt % to 50 wt %, particularly preferably 5 wt % to 30 wt % with respect to the total amount of the monomer, oligomer, and prepolymer in the composition for forming a hard coat layer. As long as the total content falls within such range, a hard coat layer excellent in balance among hardness, flexibility, and adhesiveness can be formed.

The composition for forming a hard coat layer may contain a (meth)acrylic prepolymer having a hydroxyl group. When the composition for forming a hard coat layer contains the (meth)acrylic prepolymer having a hydroxyl group, the shrinkage on curing of a hard coat layer to be obtained can be reduced. In addition, a hard coat layer excellent in scratch resistance as a result of the formation of a block layer in the hard coat layer can be formed. In addition, as the (meth)acrylic prepolymer has a hydroxyl group, an optical laminate excellent in adhesiveness between the (meth)acrylic resin film and the hard coat layer can be obtained. As the (meth)acrylic prepolymer having a hydroxyl group, there is given a polymer obtained by polymerization of at least one monomer selected from the group consisting of 2-hydroxyethyl (meth)acrylate, 2,3-dihydroxypropyl (meth)acrylate, 2-hydroxy-3-acryloyloxy-propyl (meth)acrylate, and 2-acryloyloxy-3-hydroxypropyl (meth)acrylate. The (meth)acrylic prepolymer having a hydroxyl group may be used alone or in combination.

The content of the (meth)acrylic prepolymer having a hydroxyl group is preferably 5 wt % to 50 wt %, more preferably 10 wt % to 30 wt % with respect to the total amount of the monomer, oligomer, and prepolymer in the composition for forming a hard coat layer. As long as the content falls within such range, a composition for forming a hard coat layer excellent in applicability is obtained. In addition, the shrinkage on curing of the formed hard coat layer can be effectively prevented.

The composition for forming a hard coat layer preferably contains any appropriate photopolymerization initiator. Examples of the photopolymerization initiator include 2,2-dimethoxy-2-phenylacetophenone, acetophenone, benzophenone, xanthone, 3-methylacetophenone, 4-chlorobenzophenone, 4,4'-dimethoxybenzophenone, benzoin propyl ether, benzyl dimethyl ketal, N,N,N',N'-tetramethyl-4,4'-diaminobenzophenone, 1-(4-isopropylphenyl)-2-hydroxy-2-methylpropan-1-one, and a thioxanthone-based compound.

In one embodiment, the surface of the hard coat layer opposite to the base material layer has an uneven structure. When the surface of the hard coat layer is of an uneven structure, antiglare property can be imparted to the optical laminate. A method of forming such uneven structure is, for example, a method involving incorporating fine particles into the composition for forming a hard coat layer. The fine particles may be inorganic fine particles or may be organic fine particles. Examples of the inorganic fine particle include a silicon oxide fine particle, a titanium oxide fine particle, an aluminum oxide fine particle, a zinc oxide fine particle, a tin oxide fine particle, a calcium carbonate fine particle, a valium sulfate fine particle, a talc fine particle, a kaolin fine particle, and a calcium sulfate fine particle. Examples of the organic fine particle include a polymethyl methacrylate resin powder (PMMA fine particle), a silicone resin powder, a polystyrene resin powder, a polycarbonate resin powder, an acryl styrene resin powder, a benzoguanamine resin powder, a melamine resin powder, a polyolefin resin powder, a polyester resin powder, a polyamide resin powder, a polyimide resin powder, and a polyethylene fluoride resin powder. Those fine particles may be used alone or in combination.

Any appropriate shape can be adopted as the shape of each of the fine particles. The shape is preferably a substantially spherical shape and is more preferably a substantially spherical shape having an aspect ratio of 1.5 or less. The weight-average particle diameter of the fine particles is preferably 1 μm to 30 μm, more preferably 2 μm to 20 μm. The weight-average particle diameter of the fine particles can be measured by, for example, a Coulter counter method.

When the composition for forming a hard coat layer contains the fine particles, the content of the fine particles is preferably 1 wt % to 60 wt %, more preferably 2 wt % to 50 wt % with respect to the total amount of the monomer, oligomer, and prepolymer in the composition for forming a hard coat layer.

The composition for forming a hard coat layer can further contain any appropriate additive. Examples of the additive include a leveling agent, an antiblocking agent, a dispersion stabilizer, a thixotropic agent, an antioxidant, a UV absorbing agent, an antifoaming agent, a tackifier, a dispersant, a surfactant, a catalyst, a filler, a lubricant, and an antistatic agent.

For example, fluorine- or silicone-based leveling agents are given as the leveling agent, and the leveling agent is preferably a silicone-based leveling agent. Examples of the silicone-based leveling agent include a reactive silicone, a polydimethylsiloxane, a polyether-modified polydimethylsiloxane, and a polymethylalkylsiloxane. Of those, a reactive silicone is preferred. When the reactive silicone is added, sliding property is imparted to the surface of the hard coat layer and its scratch resistance continues over a long time period. The content of the leveling agent is preferably 5 wt % or less, more preferably 0.01 wt % to 5 wt % with respect to the total amount of the monomer, oligomer, and prepolymer in the composition for forming a hard coat layer.

The composition for forming a hard coat layer may or may not include a solvent. Examples of the solvent include dibutyl ether, dimethoxymethane, dimethoxyethane, diethoxyethane, propylene oxide, 1,4-dioxane, 1,3-dioxolane, 1,3,5-trioxane, tetrahydrofuran, acetone, methyl ethyl ketone (MEK), diethylketone, dipropyl ketone, diisobutyl ketone, cyclopentanone (CPN), cyclohexanone, methylcyclohexanone, ethyl formate, propyl formate, n-pentyl formate, methyl acetate, ethyl acetate, methyl propionate, ethyl propionate, n-pentyl acetate, acetyl acetone, diacetone alcohol, methyl acetoacetate, ethyl acetoacetate, methanol, ethanol, 1-propanol, 2-propanol, 1-butanol, 2-butanol, 1-pentanol, 2-methyl-2-butanol, cyclohexanol, isopropyl alcohol (IPA), isobutyl acetate, methyl isobutyl ketone (MIBK), 2-octanone, 2-pentanone, 2-hexanone, 2-heptanone, 3-heptanone, ethylene glycol monoethyl ether acetate, ethylene glycol monoethyl ether, ethylene glycol monobutyl ether, ethylene glycol monomethyl ether, propylene glycol monomethyl ether acetate, and propylene glycol monomethyl ether. Those solvents may be used alone or in combination.

According to the present invention, even when a composition for forming a hard coat layer free of any solvent or a composition for forming a hard coat layer containing only a poor solvent for the formation materials for the (meth) acrylic resin film as a solvent is used, the composition for forming a hard coat layer penetrates into the (meth)acrylic resin film and hence a penetration layer having a desired thickness can be formed.

The thickness of the hard coat layer is preferably 1 μm to 20 μm, more preferably 3 μm to 10 μm.

As described above, the (meth)acrylic resin forming the (meth)acrylic resin film may be present in the hard coat layer as a result of the elution of the (meth)acrylic resin into the composition for forming a hard coat layer. When the (meth) acrylic resin forming the (meth)acrylic resin film is present in the hard coat layer, in one embodiment, the concentration of the (meth)acrylic resin continuously reduces from the base material layer side of the penetration layer to the hard coat layer. In such embodiment, the concentration of the (meth)acrylic resin continuously changes, i.e., no interface resulting from a change in concentration of the (meth)acrylic resin is formed, and hence interface reflection can be suppressed and an optical laminate showing small interference unevenness can be obtained. In another embodiment, the (meth)acrylic resin and the composition for forming a hard coat layer undergo a phase separation, and hence a block layer is formed on the side of the hard coat layer opposite to the penetration layer. It is preferred that in such embodiment as well, the concentration of the (meth)acrylic resin continuously reduce from the base material layer side of the penetration layer to the hard coat layer excluding the block layer.

The thickness of the block layer is preferably 1 μm to 10 μm, more preferably 2 μm to 5 μm. It should be noted that the thickness of the block layer can be measured on the basis of: the reflection spectrum of the hard coat layer; or observation with an electron microscope such as an SEM or a TEM.

E. Other Layers

In the optical laminate of the present invention, any appropriate other layer can be placed outside the hard coat layer as required. Representative examples thereof include an antireflection layer and an antiglare layer. An antireflection layer and antiglare layer typically used in the industry can be adopted as the antireflection layer and the antiglare layer.

F. Method of Producing Optical Laminate

A method of producing the optical laminate of the present invention includes: applying the composition for forming a hard coat layer onto the (meth)acrylic resin film to form an application layer; and heating the application layer. The hard coat layer is preferably formed by subjecting the application layer after the heating to a curing treatment.

As a method of applying the composition for forming a hard coat layer, any appropriate method may be adopted. Examples of the method include a bar coating method, a roll coating method, a gravure coating method, a rod coating method, a slot orifice coating method, a curtain coating method, a fountain coating method, and a comma coating method.

The heating temperature of the application layer can be set to an appropriate temperature in accordance with the composition of the composition for forming a hard coat layer, and is preferably set to a temperature equal to or less than the glass transition temperature of the resin in the (meth)acrylic resin film. When the heating is performed at a temperature equal to or less than the glass transition temperature of the resin in the (meth)acrylic resin film, an optical laminate whose deformation due to heating has been suppressed can be obtained. The heating temperature of the application layer is, for example, 80° C. to 140° C. When the heating is performed at a temperature in such range, the monomer, oligomer, and/or prepolymer in the composition for forming a hard coat layer each penetrate and diffuse/penetrates and diffuses into the (meth)acrylic resin film favorably. The penetration layer described in the section C is formed of the composition for forming a hard coat layer that has penetrated through the heating and the subsequent curing treatment, and the formation materials for the (meth)acrylic resin film. As a result, an optical laminate that is excellent in adhesiveness between the (meth)acrylic resin film and the hard coat layer, and that has suppressed interference unevenness can be obtained. It should be noted that when the composition for forming a hard coat layer contains a solvent, the applied composition for forming a hard coat layer can be dried by the heating.

In one embodiment, the heating temperature can be set in accordance with the contents of the curable compound having two or more (meth)acryloyl groups and the monofunctional monomer. As the contents/content of the curable compound having two or more (meth)acryloyl groups and/or monofunctional monomer in the composition for forming a hard coat layer increase/increases, a lower heating temperature (e.g., 80° C. to 100° C.) can provide an optical laminate that is excellent in adhesiveness and has suppressed interference unevenness, and can provide a production process having a small environmental load and good efficiency.

Any appropriate curing treatment can be adopted as the curing treatment. The curing treatment is representatively performed by UV irradiation. The cumulative light quantity of the UV irradiation is preferably 200 mJ to 400 mJ.

EXAMPLES

Hereinafter, the present invention is specifically described by way of examples but the present invention is not limited by these examples. Evaluation methods in the examples are as described below. In addition, in the examples, the terms "part (s)" and "%" refer to "part (s) by weight" and "wt %," respectively unless otherwise stated.

(1) Refractive Index

The refractive indices of a base material layer and a hard coat layer were measured with an Abbe refractometer manufactured by ATAGO CO., LTD. (trade name: DR-M2/1550) by selecting monobromonaphthalene as an intermediate liquid.

(2) Thickness of Penetration Layer

A black acrylic plate (manufactured by MITSUBISHI RAYON CO., LTD. and having a thickness of 2 mm) was attached to the base material layer side of an optical laminate obtained in each of Examples and Comparative Examples through an acrylic pressure-sensitive adhesive having a thickness of 20 μm. Next, the reflection spectrum of the hard coat layer was measured with an instantaneous multi-spot photometry system (manufactured by Otsuka Electronics Co., Ltd., trade name: MCPD3700) under the following conditions, and then the thickness of (hard coat layer+penetration layer) was evaluated from the peak position of an FFT spectrum. It should be noted that the values measured in the section (1) were used as the refractive indices.

Conditions for Measurement of Reflection Spectrum
Reference: A mirror
Algorithm: An FFT method
Calculation wavelength: 450 nm to 850 nm
Detection Conditions
Exposure time: 20 ms
Lamp gain: Normal
Cumulative number: 10 times
FFT Method
Range of thickness value: 2 to 15 μm
Thickness resolution: 24 nm In addition, the thickness of the hard coat layer of each of Examples 1 to 6, 8, and 9, and Comparative Examples 1 to 6 was evaluated by the reflection spectrum measurement for the following laminate (R1). The thickness of the hard coat layer of Example 7 was evaluated by the reflection spectrum measurement for the following laminate (R2).

Laminate (R1): The laminate was obtained in the same manner as in Example 1 except that a PET base material (manufactured by Toray Industries, Inc., trade name: U48-3, refractive index: 1.60) was used as a base material film and the heating temperature of an application layer was set to 60° C.

Laminate (R2): The laminate was obtained in the same manner as in Example 7 except that a PET base material (manufactured by Toray Industries, Inc., trade name: U48-3, refractive index: 1.60) was used as a base material film and the heating temperature of an application layer was set to 60° C.

Figure 3:
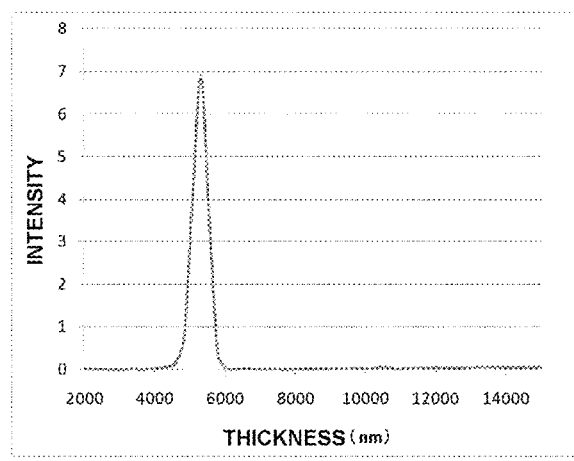
FIG. 3 shows the fast Fourier transformation (FFT) spectrum of the surface of the hard coat layer of a laminate (R1) to be used in the evaluation of Examples.

It should be noted that the thickness of only the hard coat layer is measured from the peak position of the FFT spectrum obtained from each of the laminate (R1) and the laminate (R2) because a composition for forming a hard coat layer does not penetrate into the PET base material to be used in each of these laminates. As a result of the evaluation, the thickness of the hard coat layer of each of Examples 1 to 6, 8, and 9, and Comparative Examples 1 to 6 was 5.3 μm, and the thickness of the hard coat layer of Example 7 was 4.4 μm. FIG. 3 shows the FFT spectrum of the laminate (R1).

A positive value calculated from the equation "(thickness of (hard coat layer+penetration layer))–(thickness of (hard coat layer))" was defined as the thickness of the penetration layer. It should be noted that in the case where the thickness of the penetration layer was 0 μm according to the FFT spectrum (each of Comparative Examples 1 and 4), the fact that no penetration layer was formed was actually confirmed by the observation of a section of the optical laminate with an SEM.

(3) Adhesiveness of Hard Coat Layer

The adhesiveness of the hard coat layer with the base material film was evaluated in conformity with the crosscut peel test of JIS K-5400 (crosscut number: 100).

(4) Interference Unevenness 1

A black acrylic plate (manufactured by MITSUBISHI RAYON CO., LTD. and having a thickness of 2 mm) was attached to the base material layer side of the optical laminate obtained in each of Examples and Comparative Examples through an acrylic pressure-sensitive adhesive. After that, under a three-band fluorescent lamp, interference unevenness was visually observed and evaluated by the following criteria.
4: No interference unevenness occurs.
3: The occurrence of interference unevenness is slightly observed but no problem arises in practical use.
2: The occurrence of interference unevenness is considerably observed.
1: The occurrence of interference unevenness is remarkably observed.

(5) Interference Unevenness 2

The interference unevenness of the optical laminate obtained in each of Examples and Comparative Examples was evaluated from an amplitude in the wavelength region of 500 nm to 600 nm of the reflection spectrum of the hard coat layer measured by the evaluation in the section (2).

<Production Example 1> Production of Base Material Film A

100 Parts by weight of an imidized MS resin described in Production Example 1 of Japanese Patent Application Laid-open No. 2010-284840 and 0.62 part by weight of a triazine-based UV absorbing agent (manufactured by ADEKA CORPORATION, trade name: T-712) were mixed with a biaxial kneader at 220° C. to produce a resin pellet. The resultant resin pellet was dried at 100.5 kPa and 100° C. for 12 hours, and was then extruded from the T-die of a uniaxial extruder at a die temperature of 270° C. to be formed into a film shape (having a thickness of 160 μm). Further, the film was stretched in its conveyance direction under an atmosphere at 150° C. (to have a thickness of 80 μm). Next, the film was stretched in a direction perpendicular to the film conveyance direction under an atmosphere at 150° C. to provide a base material film A ((meth)acrylic resin film) having a thickness of 40 μm. The resultant base material film A had a transmittance for light having a wavelength of 380 nm of 8.5%, an in-plane retardation Re of 0.4 nm, and a thickness direction retardation Rth of 0.78 nm. In addition, the resultant base material film A had a moisture permeability of 61 g/m²·24 hr. It should be noted that the light transmittance was obtained by measuring a transmittance spectrum in the wavelength range of 200 nm to 800 nm with a spectrophotometer manufactured by Hitachi High-Technologies Corporation (apparatus name; U-4100) and reading a transmittance at a wavelength of 380 nm. In addition, the retardation values were each measured with a product available under the trade name "KOBRA21-ADH" from Oji Scientific Instruments at a wavelength of 590 nm and 23° C. The moisture permeability was measured by a method in conformity with JIS K0208 under the conditions of a temperature of 40° C. and a relative humidity of 92%.

Example 1

100 Parts of a UV-curable resin (manufactured by DIC Corporation, trade name: UNIDIC 17-806, solid content: 80%, solvent: butyl acetate) containing 13 parts of isocyanuric acid triacrylate, parts of pentaerythritol triacrylate, 62 parts of dipentaerythritol hexaacrylate, and 9 parts of isophorone diisocyanate polyurethane, 5 parts of a leveling agent (manufactured by DIC Corporation, trade name: GRANDIC PC-4100), and 3 parts of a photopolymerization initiator (manufactured by Ciba Japan, trade name: IRGACURE 907) were mixed, and then the mixture was diluted with methyl isobutyl ketone so that a solid content concentration became 50%. Thus, a composition for forming a hard coat layer was prepared.

Figure 4A:
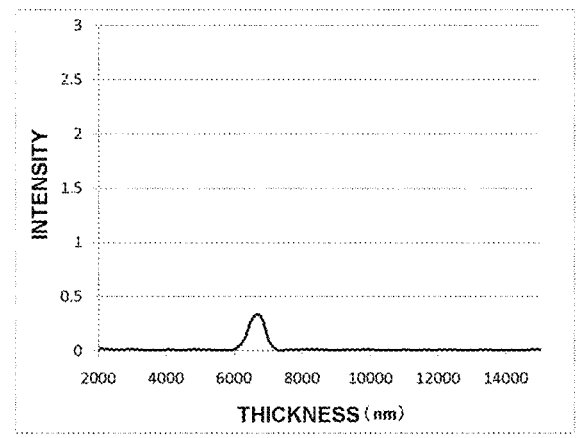
FIG. 4A shows the reflection spectrum of the surface of the hard coat layer of an optical laminate of Example 1.
Figure 4B:
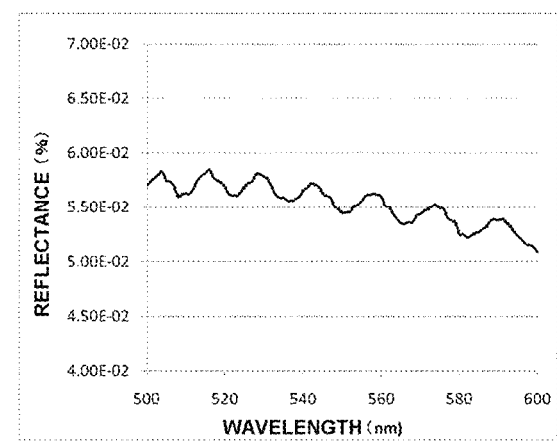
FIG. 4B shows the FFT spectrum of the surface of the hard coat layer of the optical laminate of Example 1.

The resultant composition for forming a hard coat layer was applied onto the base material film A obtained in Production Example 1 to form an application layer, and then the application layer was heated at 110° C. for 1 minute. The application layer after the heating was cured by irradiating the application layer with UV light having a cumulative light quantity of 300 mJ/cm² from a high-pressure mercury lamp, whereby a base material layer, a hard coat layer, and a penetration layer were formed. Thus, an optical laminate was obtained. The optical laminate was subjected to the evaluations in the sections (2) to (5). Table 1 below shows the results. In addition, FIG. 4A shows an actual reflection spectrum obtained by the evaluation in the section (2) and FIG. 4B shows an FFT spectrum obtained by the evaluation.

Example 2

An optical laminate was obtained in the same manner as in Example 1 except that the heating temperature of the application layer was set to 120° C. The optical laminate was subjected to the evaluations in the sections (2) to (5). Table 1 below shows the results.

Example 3

100 Parts of a UV-curable resin (manufactured by DIC Corporation, trade name: PC1070, solid content: 66%, solvents:ethyl acetate and butyl acetate) containing a urethane acrylate obtained from a pentaerythritol-based acrylate and a hydrogenated xylene diisocyanate, dipentaerythritol hexaacrylate, pentaerythritol triacrylate, pentaerythritol tetraacrylate, a (meth)acrylic polymer having a 2-hydroxyethyl group and a 2,3-dihydroxypropyl group, and photoreaction initiators (manufactured by Ciba Japan, trade name: IRGACURE 184; manufactured by BASF, trade name: Lucirin TPO), and 5 parts of a leveling agent (manufactured by DIC Corporation, trade name: GRANDIC PC-4100) were mixed, and then the mixture was diluted with methyl isobutyl ketone so that a solid content concentration became 50%. Thus, a composition for forming a hard coat layer was prepared. It should be noted that the composition of the UV-curable resin (PC1070) is as described below.

| | |
|---|---|
| Urethane acrylate obtained from a pentaerythritol-based acrylate and a hydrogenated xylene diisocyanate | 100 parts |
| Dipentaerythritol hexaacrylate | 49 parts |
| Pentaerythritol tetraacrylate | 41 parts |
| Pentaerythritol triacrylate | 24 parts |
| (Meth)acrylic polymer having a 2-hydroxyethyl group and a 2,3-dihydroxypropyl group | 58 parts |

The resultant composition for forming a hard coat layer was applied onto the base material film obtained in Production Example 1 to form an application layer, and then the application layer was heated at 120° C. for 1 minute. The application layer after the heating was cured by irradiating the application layer with UV light having a cumulative light quantity of 300 mJ/cm² from a high-pressure mercury lamp, whereby a base material layer, a hard coat layer, and a penetration layer were formed. Thus, an optical laminate was obtained. The optical laminate was subjected to the evaluations in the sections (2) to (5). Table 1 below shows the results.

Example 4

100 Parts of the UV-curable resin (manufactured by DIC Corporation, trade name: PC1070, solid content: 66%, solvents: ethyl acetate and butyl acetate), 40 parts of pentaerythritol triacrylate (PETA) (manufactured by Osaka Organic Chemical Industry Ltd., trade name: VISCOAT #300), 5 parts of a leveling agent (manufactured by DIC Corporation, trade name: GRANDIC PC-4100), and 1.2 parts of a photoreaction initiator (manufactured by Ciba Japan, trade name: IRGACURE 907) were mixed, and then the mixture was diluted with methyl isobutyl ketone so that a solid content concentration became 50%. Thus, a composition for forming a hard coat layer was prepared.

The resultant composition for forming a hard coat layer was applied onto the base material film obtained in Production Example 1 to form an application layer, and then the application layer was heated at 100° C. for 1 minute. The application layer after the heating was cured by irradiating the application layer with UV light having a cumulative light quantity of 300 mJ/cm² from a high-pressure mercury lamp, whereby a base material layer, a hard coat layer, and a penetration layer were formed. Thus, an optical laminate was obtained. The optical laminate was subjected to the evaluations in the sections (2) to (5). Table 1 below shows the results.

Example 5

An optical laminate was obtained in the same manner as in Example 1 except that pentaerythritol triacrylate (PETA) (manufactured by Osaka Organic Chemical Industry Ltd., trade name: VISCOAT #300) was used instead of the UV-curable resin (manufactured by DIC Corporation, trade name: UNIDIC 17-806). The optical laminate was subjected to the evaluations in the sections (2) to (5). Table 1 below shows the results.

Example 6

An optical laminate was obtained in the same manner as in Example 1 except that: pentaerythritol triacrylate (PETA) (manufactured by Osaka Organic Chemical Industry Ltd., trade name: VISCOAT #300) was used instead of the UV-curable resin (manufactured by DIC Corporation, trade name: UNIDIC 17-806); and the heating temperature of the application layer was set to 100° C. The optical laminate was subjected to the evaluations in the sections (2) to (5). Table 1 below shows the results.

Example 7

An optical laminate was obtained in the same manner as in Example 1 except that a mixture of 60 parts of a urethane acrylic oligomer, parts of pentaerythritol tetraacrylate, and 10 parts of pentaerythritol triacrylate (manufactured by The Nippon Synthetic Chemical Industry Co., Ltd., trade name: UV-7600-B) was used instead of 100 parts of the UV-curable resin (manufactured by DIC Corporation, trade name: UNIDIC 17-806). The optical laminate was subjected to the evaluations in the sections (2) to (5). Table 1 below shows the results.

Example 8

An optical laminate was obtained in the same manner as in Example 1 except that the composition for forming a hard coat layer was prepared through dilution with isopropyl alcohol instead of methyl isobutyl ketone. The optical laminate was subjected to the evaluations in the sections (2) to (5). Table 1 below shows the results.

Example 9

An optical laminate was obtained in the same manner as in Example 1 except that: a mixture of 30 parts of dipentaerythritol hexaacrylate (DPHA) (manufactured by Shin Nakamura Chemical Co., Ltd., trade name: A-DPH), 55 parts of pentaerythritol triacrylate (PETA) (manufactured by Osaka Organic Chemical Industry Ltd., trade name: VISCOAT #300), and 15 parts of acryloylmorpholine (ACMO) (manufactured by KOHJIN Holdings Co., Ltd.) was used instead of 100 parts of the UV-curable resin (manufactured by DIC Corporation, trade name: UNIDIC 17-806); and the composition for forming a hard coat layer was prepared without the use of any solvent. The optical laminate was subjected to the evaluations in the sections (2) to (5). Table 1 below shows the results.

Example 10

An optical laminate was obtained in the same manner as in Example 1 except that: a mixture of 30 parts of dipentaerythritol hexaacrylate (DPHA) (manufactured by Shin Nakamura Chemical Co., Ltd., trade name: A-DPH), 55 parts of pentaerythritol triacrylate (PETA) (manufactured by Osaka Organic Chemical Industry Ltd., trade name: VISCOAT #300), and 15 parts of acryloylmorpholine (ACMO) (manufactured by KOHJIN Holdings Co., Ltd.) was used instead of 100 parts of the UV-curable resin (manufactured by DIC Corporation, trade name: UNIDIC 17-806); the composition for forming a hard coat layer was prepared without the use of any solvent; and the heating temperature of the application layer was set to 95° C. The optical laminate was subjected to the evaluations in the sections (2) to (5). Table 1 below shows the results.

Example 11

An optical laminate was obtained in the same manner as in Example 1 except that: instead of 100 parts of the UV-curable resin (manufactured by DIC Corporation, trade name: UNIDIC 17-806), a mixed resin of the UNIDIC 17-806 (100 parts) and 40 parts of pentaerythritol triacrylate (PETA) (manufactured by Osaka Organic Chemical Industry Ltd., trade name: VISCOAT #300) was used; and the heating temperature of the application layer was set to 100° C. The optical laminate was subjected to the evaluations in the sections (2) to (5). Table 1 below shows the results.

Example 12

An optical laminate was obtained in the same manner as in Example 1 except that: instead of 100 parts of the UV-curable resin (manufactured by DIC Corporation, trade name: UNIDIC 17-806), a mixed resin of the UNIDIC 17-806 (100 parts) and 20 parts of acryloylmorpholine (ACMO) (manufactured by KOHJIN Holdings Co., Ltd.) was used; and the heating temperature of the application layer was set to 100° C. The optical laminate was subjected to the evaluations in the sections (2) to (5). Table 1 below shows the results.

Example 13

An optical laminate was obtained in the same manner as in Example 1 except that: instead of 100 parts of the UV-curable resin (manufactured by DIC Corporation, trade name: UNIDIC 17-806), a mixed resin of the UNIDIC 17-806 (100 parts) and 20 parts of acryloylmorpholine (ACMO) (manufactured by KOHJIN Holdings Co., Ltd.) was used; and the heating temperature of the application layer was set to 95° C. The optical laminate was subjected to the evaluations in the sections (2) to (5). Table 1 below shows the results.

Example 14

An optical laminate was obtained in the same manner as in Example 1 except that: a composition for forming a hard coat layer was used, which was prepared by mixing 100 parts of a UV-curable resin (manufactured by DIC Corporation, trade name: UNIDIC 17-806, solid content: 80%, solvent: butyl acetate), 20 parts of 4-hydroxybutyl acrylate (4-HBA) (manufactured by Osaka Organic Chemical Industry Ltd.), 5 parts of a leveling agent (manufactured by DIC Corporation, trade name: GRANDIC PC-4100), and 3 parts of a photopolymerization initiator (manufactured by Ciba Japan, trade name: IRGACURE 907), and diluting the mixture with methyl isobutyl ketone so that a solid content concentration became 50%; and the heating temperature of the application layer was set to 90° C. The optical laminate was subjected to the evaluations in the sections (2) to (5). Table 1 below shows the results.

Example 15

An optical laminate was obtained in the same manner as in Example 1 except that: a composition for forming a hard coat layer was used, which was prepared by mixing 100 parts of a UV-curable resin (manufactured by DIC Corporation, trade name: UNIDIC 17-806, solid content: 80%, solvent: butyl acetate), 20 parts of N-(2-hydroxyethyl acrylamide (HEAA) (manufactured by KOHJIN Holdings Co., Ltd.), 5 parts of a leveling agent (manufactured by DIC Corporation, trade name: GRANDIC PC-4100), and 3 parts of a photopolymerization initiator (manufactured by Ciba Japan, trade name: IRGACURE 907), and diluting the mixture with methyl isobutyl ketone so that a solid content concentration became 50%; and the heating temperature of the application layer was set to 90° C. The optical laminate was subjected to the evaluations in the sections (2) to (5). Table 1 below shows the results.

Example 16

An optical laminate was obtained in the same manner as in Example 1 except that: a composition for forming a hard coat layer was used, which was prepared by mixing 80 parts of the "UV-7600-B" manufactured by The Nippon Synthetic Chemical Industry Co., Ltd., 20 parts of 4-hydroxybutyl acrylate (4-HBA) (manufactured by Osaka Organic Chemical Industry Ltd.), 5 parts of a leveling agent (manufactured by DIC Corporation, trade name: GRANDIC PC-4100), and 3 parts of a photopolymerization initiator (manufactured by Ciba Japan, trade name: IRGACURE 907), and diluting the mixture with methyl isobutyl ketone so that a solid content concentration became 50%; and the heating temperature of the application layer was set to 90° C. The optical laminate was subjected to the evaluations in the sections (2) to (5). Table 1 below shows the results.

Example 17

An optical laminate was obtained in the same manner as in Example 1 except that: a composition for forming a hard coat layer was used, which was prepared by mixing 80 parts of the "UV-7600-B" manufactured by The Nippon Synthetic Chemical Industry Co., Ltd., 20 parts of N-(2-hydroxyethyl acrylamide (HEAA) (manufactured by KOHJIN Holdings Co., Ltd.), 5 parts of a leveling agent (manufactured by DIC Corporation, trade name: GRANDIC PC-4100), and 3 parts of a photopolymerization initiator (manufactured by Ciba Japan, trade name: IRGACURE 907), and diluting the mixture with methyl isobutyl ketone so that a solid content concentration became 50%; and the heating temperature of the application layer was set to 90° C. The optical laminate was subjected to the evaluations in the sections (2) to (5). Table 1 below shows the results.

Example 18

An optical laminate was obtained in the same manner as in Example 1 except that: a composition for forming a hard coat layer was used, which was prepared by mixing 106 parts of a UV-curable resin (manufactured by DIC Corporation, trade name: UNIDIC 17-806, solid content: 80%, solvent: butyl acetate), 15 parts of 4-hydroxybutyl acrylate (4-HBA) (manufactured by Osaka Organic Chemical Industry Ltd.), 5 parts of a leveling agent (manufactured by DIC Corporation, trade name: GRANDIC PC-4100), and 3 parts of a photopolymerization initiator (manufactured by Ciba Japan, trade name: IRGACURE 907), and diluting the mixture with methyl isobutyl ketone so that a solid content concentration became 50%; and the heating temperature of the application layer was set to 90° C. The optical laminate was subjected to the evaluations in the sections (2) to (5). Table 1 below shows the results.

Example 19

An optical laminate was obtained in the same manner as in Example 1 except that: a composition for forming a hard coat layer was used, which was prepared by mixing 106 parts of a UV-curable resin (manufactured by DIC Corporation, trade name: UNIDIC 17-806, solid content: 80%, solvent: butyl acetate), 15 parts of N-(2-hydroxyethyl acrylamide (HEAA) (manufactured by KOHJIN Holdings Co., Ltd.), 5 parts of a leveling agent (manufactured by DIC Corporation, trade name: GRANDIC PC-4100), and 3 parts of a photopolymerization initiator (manufactured by Ciba Japan, trade name: IRGACURE 907), and diluting the mixture with methyl isobutyl ketone so that a solid content concentration became 50%; and the heating temperature of the application layer was set to 90° C. The optical laminate was subjected to the evaluations in the sections (2) to (5). Table 1 below shows the results.

Example 20

An optical laminate was obtained in the same manner as in Example 1 except that: a composition for forming a hard coat layer was used, which was prepared by mixing 88 parts of a UV-curable resin (manufactured by DIC Corporation, trade name: UNIDIC 17-806, solid content: 80%, solvent: butyl acetate), 30 parts of 4-hydroxybutyl acrylate (4-HBA) (manufactured by Osaka Organic Chemical Industry Ltd.), 5 parts of a leveling agent (manufactured by DIC Corporation, trade name: GRANDIC PC-4100), and 3 parts of a photopolymerization initiator (manufactured by Ciba Japan, trade name: IRGACURE 907), and diluting the mixture with methyl isobutyl ketone so that a solid content concentration became 50%; and the heating temperature of the application layer was set to 90° C. The optical laminate was subjected to the evaluations in the sections (2) to (5). Table 1 below shows the results.

Example 21

An optical laminate was obtained in the same manner as in Example 1 except that: a composition for forming a hard coat layer was used, which was prepared by mixing 80 parts of pentaerythritol triacrylate (PETA) (manufactured by Osaka Organic Chemical Industry Ltd., trade name: VISCOAT #300), 20 parts of 4-hydroxybutyl acrylate (4-HBA) (manufactured by Osaka Organic Chemical Industry Ltd.), 5 parts of a leveling agent (manufactured by DIC Corporation, trade name: GRANDIC PC-4100), and 3 parts of a photopolymerization initiator (manufactured by Ciba Japan, trade name: IRGACURE 907), and diluting the mixture with methyl isobutyl ketone so that a solid content concentration became 50%; and the heating temperature of the application layer was set to 90° C. The optical laminate was subjected to the evaluations in the sections (2) to (5). Table 1 below shows the results.

Comparative Example 1

An optical laminate was obtained in the same manner as in Example 1 except that a cycloolefin-based base material (manufactured by ZEON CORPORATION, trade name: ZEONOR ZF14) was used instead of the base material film A obtained in Production Example 1. The optical laminate was subjected to the evaluations in the sections (2) to (5). Table 1 below shows the results.

Comparative Example 2

An optical laminate was obtained in the same manner as in Example except that: a triacetylcellulose (TAC) base material (manufactured by FUJIFILM Corporation, trade name: TD80UL) was used instead of the base material film A obtained in Production Example 1; and the heating temperature of the application layer was set to 60° C. The optical laminate was subjected to the evaluations in the sections (2) to (5). Table 1 below shows the results.

Comparative Example 3

Figure 5A:
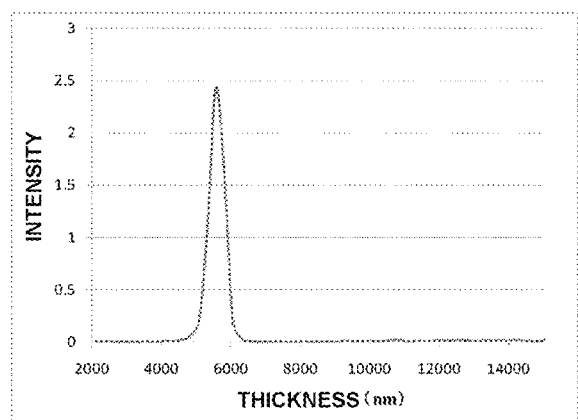
FIG. 5A shows the reflection spectrum of the surface of the hard coat layer of an optical laminate of Comparative Example 3.
Figure 5B:
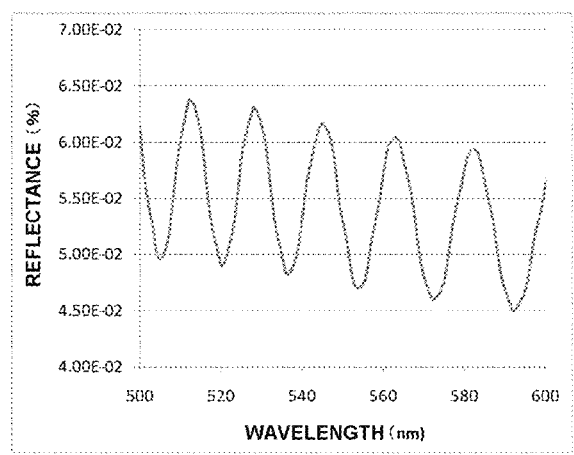
FIG. 5B shows the FFT spectrum of the surface of the hard coat layer of the optical laminate of Comparative Example 3.

An optical laminate was obtained in the same manner as in Example 1 except that a triacetylcellulose (TAC) base material (manufactured by FUJIFILM Corporation, trade name: TD80UL) was used instead of the base material film A obtained in Production Example 1. The optical laminate was subjected to the evaluations in the sections (2) to (5). Table 1 below shows the results. In addition, FIG. 5A shows an actual reflection spectrum obtained by the evaluation in the section (2) and FIG. 5B shows an FFT spectrum obtained by the evaluation.

Comparative Example 4

An optical laminate was obtained in the same manner as in Example 1 except that the heating temperature of the application layer was set to 60° C. The optical laminate was subjected to the evaluations in the sections (2) to (5). Table 1 below shows the results.

Comparative Example 5

An optical laminate was obtained in the same manner as in Example 1 except that the heating temperature of the application layer was set to 80° C. The optical laminate was subjected to the evaluations in the sections (2) to (5). Table 1 below shows the results.

Comparative Example 6

An optical laminate was obtained in the same manner as in Example 1 except that the heating temperature of the application layer was set to 100° C. The optical laminate was subjected to the evaluations in the sections (2) to (5). Table 1 below shows the results.

TABLE 1

| | Hard coat layer | | | Base material film | | Heating temperature (° C.) |
|---|---|---|---|---|---|---|
| | Composition for forming hard coat layer | Solvent | Refractive index | | Refractive index | |
| Example 1 | UNIDIC 17-806 | MIBK | 1.53 | Base material film A | 1.50 | 110 |
| Example 2 | UNIDIC 17-806 | MIBK | 1.53 | Base material film A | 1.50 | 120 |

TABLE 1-continued

| | | | | | | |
|---|---|---|---|---|---|---|
| Example 3 | PC1070 | MIBK | 1.53 | Base material film A | 1.50 | 120 |
| Example 4 | PC1070 + PETA | MIBK | 1.52 | Base material film A | 1.50 | 100 |
| Example 5 | PETA | MIBK | 1.52 | Base material film A | 1.50 | 110 |
| Example 6 | PETA | MIBK | 1.52 | Base material film A | 1.50 | 100 |
| Example 7 | UV-7600-B | MIBK | 1.52 | Base material film A | 1.50 | 110 |
| Example 8 | UNIDIC 17-806 | IPA | 1.53 | Base material film A | 1.50 | 110 |
| Example 9 | PETA + DPHA + ACMO | — | 1.52 | Base material film A | 1.50 | 110 |
| Example 10 | PETA + DPHA + ACMO | — | 1.52 | Base material film A | 1.50 | 95 |
| Example 11 | UNIDIC 17-806 + PETA | MIBK | 1.52 | Base material film A | 1.50 | 100 |
| Example 12 | UNIDIC 17-806 + ACMO | MIBK | 1.52 | Base material film A | 1.50 | 100 |
| Example 13 | UNIDIC 17-806 + ACMO | MIBK | 1.52 | Base material film A | 1.50 | 95 |
| Example 14 | UNIDIC 17-806 + 4-HBA | MIBK | 1.52 | Base material film A | 1.50 | 90 |
| Example 15 | UNIDIC 17-806 + HEAA | MIBK | 1.52 | Base material film A | 1.50 | 90 |
| Example 16 | UV-7600-B + 4-HBA | MIBK | 1.52 | Base material film A | 1.50 | 90 |
| Example 17 | UV-7600-B + 4-HEAA | MIBK | 1.52 | Base material film A | 1.50 | 90 |
| Example 18 | UNIDIC 17-806 + 4-HBA | MIBK | 1.52 | Base material film A | 1.50 | 90 |
| Example 19 | UNIDIC 17-806 + HEAA | MIBK | 1.52 | Base material film A | 1.50 | 90 |
| Example 20 | UNIDIC 17-806 + 4-HBA | MIBK | 1.52 | Base material film A | 1.50 | 90 |
| Example 21 | PETA + 4-HBA | MIBK | 1.51 | Base material film A | 1.50 | 90 |
| Comparative Example 1 | UNIDIC 17-806 | MIBK | 1.53 | Cycloolefin-based base material | 1.53 | 110 |
| Comparative Example 2 | UNIDIC 17-806 | MIBK | 1.53 | TAC base material | 1.49 | 60 |
| Comparative Example 3 | UNIDIC 17-806 | MIBK | 1.53 | TAC base material | 1.49 | 110 |
| Comparative Example 4 | UNIDIC 17-806 | MIBK | 1.53 | Base material film A | 1.50 | 60 |
| Comparative Example 5 | UNIDIC 17-806 | MIBK | 1.53 | Base material film A | 1.50 | 80 |
| Comparative Example 6 | UNIDIC 17-806 | MIBK | 1.53 | Base material film A | 1.50 | 100 |

| | Adhesiveness (number of peeled crosscuts/100) | Thickness of penetration layer (μm) | Interference unevenness <visual evaluation> | Interference unevenness <amplitude (%) of reflection spectrum> | Difference in refractive index between hard coat layer and base material film (absolute value) |
|---|---|---|---|---|---|
| Example 1 | 0 | 1.8 | 4 | 0.3 | 0.03 |
| Example 2 | 0 | 2.9 | 4 | 0.1 | 0.03 |
| Example 3 | 0 | 2.9 | 4 | 0.3 | 0.03 |
| Example 4 | 0 | 2.7 | 4 | 0.4 | 0.02 |
| Example 5 | 0 | 7.5 | 4 | 0.1 | 0.02 |
| Example 6 | 0 | 4.8 | 4 | 0.1 | 0.02 |
| Example 7 | 0 | 1.5 | 4 | 0.3 | 0.02 |
| Example 8 | 0 | 1.5 | 4 | 0.3 | 0.03 |
| Example 9 | 0 | 7 | 4 | 0.1 | 0.02 |
| Example 10 | 0 | 4.5 | 4 | 0.1 | 0.02 |
| Example 11 | 0 | 2 | 4 | 0.3 | 0.02 |
| Example 12 | 0 | 1.5 | 4 | 0.3 | 0.02 |
| Example 13 | 0 | 1.3 | 4 | 0.2 | 0.02 |
| Example 14 | 0 | 3 | 4 | 0.1 | 0.02 |
| Example 15 | 0 | 3.5 | 4 | 0.1 | 0.02 |
| Example 16 | 0 | 2.1 | 4 | 0.1 | 0.02 |
| Example 17 | 0 | 2.3 | 4 | 0.1 | 0.02 |
| Example 18 | 0 | 2.7 | 4 | 0.1 | 0.02 |
| Example 19 | 0 | 3 | 4 | 0.1 | 0.02 |
| Example 20 | 0 | 3.8 | 4 | 0.1 | 0.02 |
| Example 21 | 0 | 4.5 | 4 | 0.1 | 0.01 |

TABLE 1-continued

| | | | | | |
|---|---|---|---|---|---|
| Comparative Example 1 | 100 | 0 | 4 | 0.3 | 0.00 |
| Comparative Example 2 | 100 | 0.3 | 1 | 1.3 | 0.04 |
| Comparative Example 3 | 100 | 0.3 | 1 | 1.5 | 0.04 |
| Comparative Example 4 | 100 | 0 | 1 | 0.8 | 0.03 |
| Comparative Example 5 | 100 | 0.5 | 2 | 0.7 | 0.03 |
| Comparative Example 6 | 100 | 0.5 | 2 | 0.7 | 0.03 |

As is apparent from Table 1, the optical laminate of the present invention is excellent in adhesiveness between the base material film ((meth)acrylic resin film) and the hard coat layer, and has suppressed interference unevenness because the optical laminate has the penetration layer having a predetermined thickness. In addition, according to the present invention, even when a composition for forming a hard coat layer free of any solvent (each of Examples 9 and 10) or a composition for forming a hard coat layer containing only a poor solvent for the formation materials for the base material film as a solvent (Example 8) is used, an optical laminate having a penetration layer having a predetermined thickness can be obtained.

In addition, the base material film A ((meth)acrylic resin film) used in each of the examples has a low moisture permeability. Specifically, as described above, the moisture permeability of the base material film A is 61 g/m²·24 hr and is lower than the moisture permeability of, for example, a TAC base material (manufactured by KONICA MINOLTA INC., trade name: KC4UY, moisture permeability: 800 g/m²·24 hr) having the same thickness. According to the present invention, even when such low-moisture permeability (meth)acrylic resin film is used as a base material film, an optical laminate that is excellent in adhesiveness between the base material film and a hard coat layer, and that has suppressed interference unevenness can be obtained.

INDUSTRIAL APPLICABILITY

The optical laminate of the present invention can be suitably used in an image display apparatus. The optical laminate of the present invention can be suitably used as the front plate of an image display apparatus or a protective material for a polarizer and can be particularly suitably used as the front plate of a liquid crystal display apparatus (especially a three-dimensional liquid crystal display apparatus).

REFERENCE SIGNS LIST

10 base material layer
20 penetration layer
30 hard coat layer
40 block layer
100, 200, 300 optical laminate

The invention claimed is:

1. A method of producing an optical laminate, comprising:
applying a composition for forming a hard coat layer onto a (meth)acrylic resin film to form an application layer; and
heating the application layer at 80° C. to 140° C.,
wherein the optical laminate comprises:
a base material layer formed of the (meth)acrylic resin film;
the hard coat layer formed by applying the composition for forming the hard coat layer to the (meth)acrylic resin film; and
a penetration layer formed through penetration of the composition for forming the hard coat layer into the (meth)acrylic resin film, the penetration layer being placed between the base material layer and the hard coat layer,
wherein the penetration layer has a thickness of 1.2 μm or more,
wherein the composition for forming a hard coat layer contains a (meth)acrylic prepolymer having a hydroxyl group, and
wherein the hard coat layer is formed by subjecting the application layer, after the heating, to a curing treatment by UV irradiation.

2. A method of producing the optical laminate according to claim 1, wherein the optical laminate further comprises a block layer on the side of the hard coat layer opposite to the penetration layer.

3. A method of producing the optical laminate according to claim 1, wherein in the penetration layer, a concentration of a (meth)acrylic resin forming the (meth)acrylic resin film continuously increases from a side close to the hard coat layer to a side close to the base material layer.

4. A method of producing the optical laminate according to claim 1, wherein an amplitude of a reflection spectrum of the hard coat layer in a wavelength region of 500 nm to 600 nm is 0.5% or less.

5. A method of producing the optical laminate according to claim 1, wherein an absolute value of a difference between a refractive index of the base material layer and a refractive index of the hard coat layer is 0.01 to 0.15.

6. A method of producing the optical laminate according to claim 1, wherein the (meth)acrylic resin film has a transmittance for light having a wavelength of 380 nm of 15% or less.

7. A method of producing the optical laminate according to claim 1, wherein a (meth)acrylic resin forming the (meth)acrylic resin film has a structural unit expressing positive birefringence and a structural unit expressing negative birefringence.

8. A method of producing the optical laminate according to claim 1, wherein the composition for forming a hard coat layer contains a curable compound having two or more (meth)acryloyl groups.

9. A method of producing the optical laminate according to claim 8, wherein the composition for forming a hard coat layer further contains a monofunctional monomer.

10. A method of producing the optical laminate according to claim 9, wherein the monofunctional monomer has a weight-average molecular weight of 500 or less.

11. A method of producing the optical laminate according to claim 9, wherein the monofunctional monomer has a hydroxyl group.

12. A method of producing the optical laminate according to claim 11, wherein the monofunctional monomer comprises a hydroxyalkyl (meth)acrylate and/or an N-(2-hydroxyalkyl) (meth)acrylamide.

13. A method of producing the optical laminate according to claim 1, wherein the composition for forming a hard coat layer contains a urethane (meth)acrylate and/or an oligomer of the urethane (meth)acrylate.

14. A method of producing the optical laminate according to claim 1, wherein the composition for forming a hard coat layer is free of a solvent.

15. A method of producing the optical laminate according to claim 1, wherein a surface of the hard coat layer opposite to the penetration layer has an uneven structure.

16. A method of producing the optical laminate according to claim 1, further comprising an antireflection layer on a side of the hard coat layer opposite to the penetration layer.

* * * * *